United States Patent
Mizushima et al.

(10) Patent No.: US 11,254,828 B2
(45) Date of Patent: Feb. 22, 2022

(54) GRAVURE PRINTING METHOD

(71) Applicant: KAO CORPORATION, Tokyo (JP)

(72) Inventors: Ryuma Mizushima, Wakayama (JP); Kazuki Watanabe, Sapporo (JP); Yuki Ozaki, Izumisano (JP); Takuto Matsuzono, Setagaya-ku (JP); Yasufumi Ueda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 16/957,262

(22) PCT Filed: Dec. 27, 2018

(86) PCT No.: PCT/JP2018/048219
§ 371 (c)(1),
(2) Date: Jun. 23, 2020

(87) PCT Pub. No.: WO2019/131900
PCT Pub. Date: Jul. 4, 2019

(65) Prior Publication Data
US 2020/0399483 A1  Dec. 24, 2020

(30) Foreign Application Priority Data

Dec. 27, 2017 (JP) .............................. JP2017-252496
Dec. 27, 2017 (JP) .............................. JP2017-252498
(Continued)

(51) Int. Cl.
- *C09D 11/037* (2014.01)
- *B41M 1/10* (2006.01)
- *B41F 9/10* (2006.01)

(52) U.S. Cl.
CPC .............. *C09D 11/037* (2013.01); *B41F 9/10* (2013.01); *B41M 1/10* (2013.01)

(58) Field of Classification Search
None
See application file for complete search history.

(56) References Cited

U.S. PATENT DOCUMENTS

| 1,651,097 A | 11/1927 | Molins |
| 5,389,130 A | 2/1995 | Batlaw et al. |

(Continued)

FOREIGN PATENT DOCUMENTS

| CN | 101639627 A | 2/2010 |
| CN | 101722749 A | 6/2010 |

(Continued)

OTHER PUBLICATIONS

International Search Report issued in PCT/JP2018/048219 (PCT/ISA/210), dated Mar. 12, 2019.

*Primary Examiner* — Joshua D Zimmerman
(74) *Attorney, Agent, or Firm* — Birch, Stewart, Kolasch & Birch, LLP

(57) ABSTRACT

The present invention relates to a gravure printing method of conducting printing on a printing substrate with an aqueous ink reserved in an ink pan using a furnisher roll, a gravure roll, a doctor blade and a nip roll, in which the aqueous ink contains a pigment, a polymer, an organic solvent, a surfactant and water; a content of organic solvent components of the organic solvent which have a boiling point of 100 to 260° C. in the aqueous ink is not less than 0.3% by mass and not more than 12% by mass; an average particle size of particles of the pigment is from 120 to 350 nm; and an arithmetic mean roughness (Ra) of a plate surface of the gravure roll is from 10 to 140 nm. According to the present invention, it is possible to improve transfer properties of the ink to the printing substrate such as a resin film, etc., and suppress fogging on the plate surface.

17 Claims, 3 Drawing Sheets

(30) Foreign Application Priority Data

Dec. 27, 2017 (JP) .............................. JP2017-252499
Dec. 27, 2017 (JP) .............................. JP2017-252501
Dec. 27, 2017 (JP) .............................. JP2017-252504

(56) References Cited

U.S. PATENT DOCUMENTS

| | | | |
|---|---|---|---|
| 2001/0008105 A1 | 7/2001 | Verschueren et al. | |
| 2005/0089706 A1* | 4/2005 | Urata | B41N 10/005 |
| | | | 428/546 |
| 2010/0136469 A1 | 6/2010 | Tajima et al. | |
| 2014/0141250 A1* | 5/2014 | Tateishi | C09B 67/0028 |
| | | | 428/402 |
| 2018/0244093 A1 | 8/2018 | Shigeta et al. | |
| 2018/0244932 A1 | 8/2018 | Shigeta et al. | |
| 2019/0264043 A1 | 8/2019 | Watanabe et al. | |

FOREIGN PATENT DOCUMENTS

| | | | |
|---|---|---|---|
| CN | 101750920 A | | 6/2010 |
| CN | 103072396 A | | 5/2013 |
| CN | 103146258 A | | 6/2013 |
| CN | 105252921 A | | 1/2016 |
| JP | 57-15992 A | | 1/1982 |
| JP | 60-52213 A | | 3/1985 |
| JP | S6052213 A | * | 3/1985 |
| JP | 62-134264 A | | 6/1987 |
| JP | 8-192506 A | | 7/1996 |
| JP | 2002-321336 A | | 11/2002 |
| JP | 2003-138181 A | | 5/2003 |
| JP | 2003-211814 A | | 7/2003 |
| JP | 2003-311918 A | | 11/2003 |
| JP | 2003311918 A | * | 11/2003 |
| JP | 2004-1444 A | | 1/2004 |
| JP | 2007-46036 A | | 2/2007 |
| JP | 2007-210140 A | | 8/2007 |
| JP | 2010-240897 A | | 10/2010 |
| JP | 2010-260194 A | | 11/2010 |
| JP | 2011-63768 A | | 3/2011 |
| JP | 2011-206763 A | | 10/2011 |
| JP | 2011063768 A | * | 10/2011 |
| JP | 2011-240551 A | | 12/2011 |
| JP | 2016-60885 A | | 4/2016 |
| JP | 2017-155186 A | | 9/2017 |
| JP | 2018-83938 A | | 5/2018 |
| JP | 6348672 B2 | | 6/2018 |
| JP | 6650945 B2 | | 2/2020 |
| WO | WO 2017/047267 A1 | | 3/2017 |

\* cited by examiner

GRAVURE PRINTING METHOD

FIELD OF THE INVENTION

The present invention relates to a gravure printing method.

BACKGROUND OF THE INVENTION

Gravure printing is a printing method in which an ink is transferred to a printing substrate using a gravure printing plate on which cells for receiving the ink are formed. The gravure printing is capable of well controlling a printing quality of the obtained printed material by suitably adjusting a depth of the respective cells and a distance between the cells (screen ruling: the number of screen lines) and also capable of conducting high-resolution printing, and therefore has been utilized in extensive applications.

Hitherto, an oil-based ink has been used in the gravure printing. However, from the standpoint of labor environments, global environments and disaster prevention and further in the case where the oil-based ink is used in food-related applications, a residual solvent from the oil-based ink has posed serious problems, etc. In addition, the amount of the oil-based ink used in the gravure printing has been increased, so that there tends to occur such a problem that the gravure printing is hardly capable of meeting recent needs of market such as a wide variety and small lots of printed materials, etc.

For the aforementioned reasons, the gravure printing method using an aqueous ink has been noticed. However, the aqueous ink tends to be deteriorated in drying properties and exhibit poor wettability to a surface of a printing plate owing to a surface tension thereof. Therefore, even when conducting the gravure printing using the aqueous ink by the same method as that using the oil-based ink, there tends to occur such a problem that not only decrease in printing speed, but also poor transfer properties of the ink and fogging on the printing plate are caused, so that the gravure printing method using the aqueous ink fails to provide a high-quality printed material.

Under these circumstances, various gravure printing methods have been proposed.

For example, JP 2011-240551A (Patent Literature 1) discloses a gravure printing plate whose surface roughness is defined by an arithmetic mean roughness Ra of not more than 0.050 μm, a skewness Rsk of not more than 0.0 and a kurtosis Rku of 2.5 to 4.0.

JP 2016-060885A (Patent Literature 2) discloses a resin composition for an aqueous ink that can be applied to gravure printing, which composition contains core/shell-type resin fine particle dispersion (C) obtained by subjecting an ethylenically unsaturated monomer (B) to emulsion polymerization in an aqueous medium using a carboxy group-containing water-soluble resin (A) as a polymer emulsifier; a carbodiimide group-containing resin fine particle dispersion (D); and a non-water-soluble epoxy group-containing compound (E).

JP 62-134264A (Patent Literature 3) discloses an ink supply method in which an ink subjected to ultrasonic dispersion treatment is supplied to a gravure printing plate through a furnisher roll.

JP 2010-260194A (Patent Literature 4) discloses a gravure printing press including a furnisher roll that is disposed on the opposite side of a doctor knife, in which an ink distributing roll is disposed between an ink pan and the doctor knife on the side of the doctor knife, a peripheral speed of the furnisher roll is set to 5 to 50% of a peripheral speed of a plate cylinder, and a peripheral speed of the ink distributing roll is set to 5 to 120% of the peripheral speed of the plate cylinder.

JP 2003-211814A (Patent Literature 5) discloses a gravure printing method in which printing is conducted on a resin film by using an impression cylinder (nip roll) having a rubber hardness of 75 to 90 Hs, a ceramic-plated doctor blade having a blade edge thickness of 50 to 70 μm, a printing plate having a chromium hardness of 950 to 1100 Hv and an aqueous gravure ink.

JP 2010-240897A (Patent Literature 6) discloses a doctor for gravure printing which includes a mounting portion and a blade portion projected in the form of a thin plate therefrom, in which the blade portion has a length of 1.5 to 3.0 mm in the direction in which the blade portion is projected from the mounting portion, and the surface of the blade portion has a Vickers hardness of 920 to 1500 Hv.

JP 57-15992A (Patent Literature 7) discloses a gravure printing method using a doctor including a doctor blade and a counter blade which are opposed to each other via a fine gap, in which printing is conducted by blowing a hot air from the gap between the doctor blade and the counter blade against a surface of a printing plate to dry a residual excess ink that remains unscraped by the doctor blade.

JP 2003-311918A (Patent Literature 8) discloses an aqueous gravure printing apparatus in which on a plate surface of a rotating gravure plate cylinder, there are disposed a doctor blade and an impression cylinder for pressing a printing substrate to the plate surface to transfer an aqueous ink from the plate surface to the printing substrate, and a plurality of air nozzles for blowing air against a portion of the plate surface between the doctor blade and the impression cylinder are disposed in parallel with the doctor blade.

JP 2016-060885A (Patent Literature 9) discloses a resin composition for an aqueous ink that can be applied to gravure printing, which composition contains core/shell-type resin fine particle dispersion (C) obtained by subjecting an ethylenically unsaturated monomer (B) to emulsion polymerization in an aqueous medium using a carboxy group-containing water-soluble resin (A) as a polymer emulsifier; a carbodiimide group-containing resin fine particle dispersion (D); and a non-water-soluble epoxy group-containing compound (E).

JP 2011-206763A (Patent Literature 10) discloses a gravure coating method in which when subjecting a substrate to be coated to gravure-coating with a coating agent using an impression cylinder (nip roll) and a gravure plate, the coating agent having a viscosity of more than 0 mPa·s and not more than 5 mPa·s as measured at 20° C. is applied to a resin film using the impression cylinder whose surface has a rubber hardness of 40 to 60 degrees.

SUMMARY OF THE INVENTION

The present invention relates to a gravure printing method of conducting printing on a printing substrate with an aqueous ink reserved in an ink pan using a furnisher roll, a gravure roll, a doctor blade and a nip roll, in which:

the aqueous ink contains a pigment, a polymer, an organic solvent, a surfactant and water;

a content of organic solvent components of the organic solvent which have a boiling point of not lower than 100° C. and not higher than 260° C. in the aqueous ink is not less than 0.3% by mass and not more than 12% by mass;

an average particle size of particles of the pigment is not less than 120 nm and not more than 350 nm; and an arithmetic mean roughness (Ra) of a plate surface of the gravure roll is not less than 10 nm and not more than 140 nm.

DETAILED DESCRIPTION OF THE INVENTION

Figure 1:
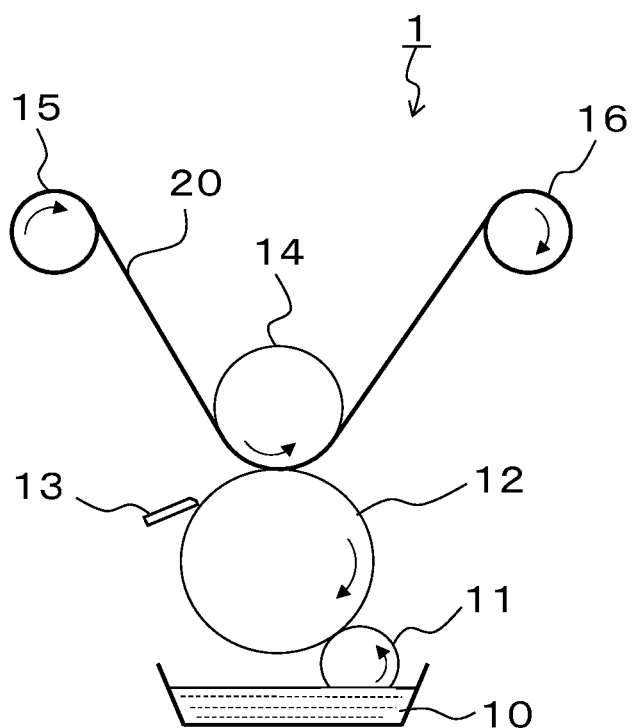
FIG. 1 is a schematic sectional view showing an embodiment of a gravure printing press that may be used in the method of the present invention.

The techniques described in the Patent Literatures 1 to 10 have in fact failed to meet the requirements in gravure printing using an aqueous ink, i.e., such requirements of improving transfer properties of the aqueous ink and suppressing fogging on a plate surface.

The present invention relates to a gravure printing method that is capable of improving transfer properties of an aqueous ink to a printing substrate such as a resin film, etc., and suppressing fogging on a plate surface.

The present inventors have noticed the relationship between a composition of the aqueous ink, an average particle size of the pigment particles and a roughness of the plate surface of the gravure roll, and have found that the aforementioned conventional problems can be solved by suitably controlling these conditions.

That is, a first embodiment of the present invention relates to a gravure printing method of conducting printing on a printing substrate with an aqueous ink reserved in an ink pan using a furnisher roll, a gravure roll, a doctor blade and a nip roll, in which:

the aqueous ink contains a pigment, a polymer, an organic solvent, a surfactant and water;

a content of organic solvent components of the organic solvent which have a boiling point of not lower than 100° C. and not higher than 260° C. in the aqueous ink is not less than 0.3% by mass and not more than 12% by mass;

an average particle size of particles of the pigment is not less than 120 nm and not more than 350 nm; and an arithmetic mean roughness (Ra) of a plate surface of the gravure roll is not less than 10 nm and not more than 140 nm.

Also, the present inventors have noticed the relationship between a composition and properties of the aqueous ink, and a rubber hardness and operation conditions of the furnisher roll, and have found that the aforementioned conventional problems can be solved by suitably controlling these conditions.

That is, a second embodiment of the present invention relates to the aforementioned gravure printing method in which:

a content of the organic solvent components having a boiling point of lower than 100° C. in the aqueous ink is not more than 5% by mass;

a static surface tension of the aqueous ink as measured at 20° C. is not less than 23 mN/m and not more than 30 mN/n;

a rubber hardness of the furnisher roll is not less than 55° and not more than 85°;

a contact pressure under which the furnisher roll is contacted with the gravure roll is not less than 0.08 MPa and not more than 0.4 MPa; and a rotating speed of the furnisher roll is not less than 4% and not more than 28% on the basis of 100% of a rotating speed of the gravure roll.

Also, the present inventors have noticed the relationship between a composition of the aqueous ink, and a Vickers hardness, a shape and operation conditions of the doctor blade, and have found that the aforementioned conventional problems can be solved by suitably controlling these conditions.

That is, a third embodiment of the present invention relates to the aforementioned gravure printing method in which:

a surface of the doctor blade has a Vickers hardness of not less than 650 Hv and not more than 1000 Hv, and a thickness of an edge portion of the doctor blade is not less than 50 μm and not more than 350 μm; and a contact pressure between the doctor blade and the gravure roll is not less than 0.04 MPa and not more than 0.35 MPa.

Also, the present inventors have noticed the relationship between a composition of the aqueous ink, and air blowing operation conditions after operating the doctor blade, and have found that the aforementioned conventional problems can be solved by suitably controlling these conditions.

That is, a fourth embodiment of the present invention relates to the aforementioned gravure printing method in which:

a dispersing medium containing the organic solvent and water has an average boiling point of not lower than 100° C. and not higher than 122° C.; and a hot air having a temperature of not lower than 15° C. and not higher than 45° C. and a relative humidity of not less than 0% and not more than 50% is blown against the plate surface of the gravure roll from air nozzles disposed at the intervals of not less than 50 mm and not more than 200 mm at an air quantity of not less than 0.05 L/min and not more than 15 L/min.

In addition, the present inventors have noticed the relationship between a composition and properties of the aqueous ink, and a rubber hardness and operation conditions of the nip roll, and have found that the aforementioned conventional problems can be solved by suitably controlling these conditions.

That is, a fifth embodiment of the present invention relates to the aforementioned gravure printing method wherein:

a rubber hardness of the nip roll is not less than 55° and not more than 85°, and a contact pressure under which the nip roll is contacted with the printing substrate is not less than 0.04 MPa and not more than 0.35 MPa.

In accordance with the present invention, it is possible to provide a gravure printing method which is capable of improving transfer properties of the aqueous ink to a printing substrate such as a resin film, etc., and suppressing fogging on a plate surface.

[Gravure Printing Method]

The gravure printing method of the present invention is characterized by conducting printing on a printing substrate with an aqueous ink reserved in an ink pan using a furnisher roll, a gravure roll, a doctor blade and a nip roll, in which:

the aqueous ink contains a pigment, a polymer, an organic solvent, a surfactant and water;

a content of organic solvent components of the organic solvent which have a boiling point of not lower than 100° C. and not higher than 260° C. in the aqueous ink is not less than 0.3% by mass and not more than 12% by mass;

an average particle size of particles of the pigment is not less than 120 nm and not more than 350 nm; and an arithmetic mean roughness (Ra) of a plate surface of the gravure roll is not less than 10 nm and not more than 140 nm.

<Gravure Printing>

Gravure printing is a printing method in which while rotating a gravure roll (gravure plate) on a surface of which recessed cells are formed, an ink is supplied to a plate surface of the gravure roll, and an excess part of the ink is scraped off by a doctor blade fixed at a predetermined position to allow the ink to remain only in the cells, followed by bringing a printing substrate continuously supplied thereto into press-contact with the gravure roll by a nip roll whose surface is formed of a rubber to transfer only the ink in the cells to the printing substrate and thereby print characters or images on the printing substrate.

FIG. 1 is a schematic sectional view showing an embodiment of a gravure printing press used in the method of the present invention. The gravure printing method using a gravure printing press 1 is explained below.

As shown in FIG. 1, the gravure printing press 1 is equipped with an ink pan 10, a furnisher roll 11, a gravure roll 12, a doctor blade 13 and a nip roll 14.

Figure 3:
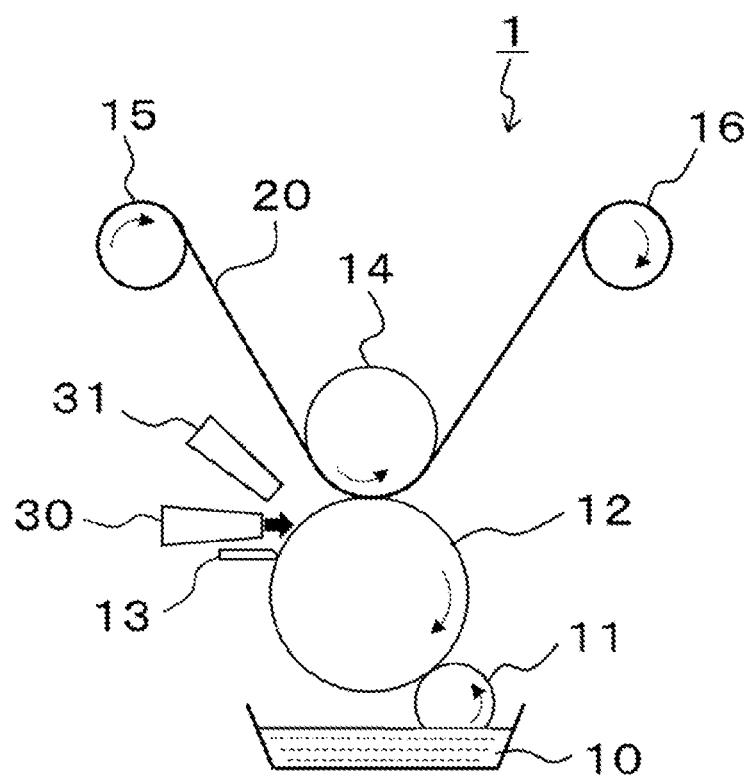
FIG. 3 is a schematic sectional view showing another embodiment of the gravure printing press that may be used in the method of the present invention.

In addition, as shown in FIG. 3, air nozzles 30 are preferably disposed between the doctor blade 13 and the nip roll 14.

The gravure printing press 1 is constructed such that the furnisher roll 11, the gravure roll 12 and the nip roll 14 are continuously rotated in the respective directions indicated by arrows as shown in FIG. 1.

The gravure printing press 1 is adapted to conduct printing on a printing substrate 20 continuously transported thereto. The gravure printing press 1 is further equipped with a printing substrate feed roll 15 for feeding the printing substrate 20 on which printing is to be conducted, and a printing substrate take-up roll 16 for taking up the printing substrate 20 on which printing has been conducted.

The ink pan 10 is adapted for reserving an aqueous ink used for printing on the printing substrate 20.

The aqueous ink contains a pigment, a polymer, an organic solvent, a surfactant and water. The content of organic solvent components having a boiling point of not lower than 100° C. and not higher than 260° C. in the aforementioned organic solvent is not less than 0.3% by mass and not more than 12% by mass, and the average particle size of particles of the pigment is not less than 120 nm and not more than 350 nm.

In the aqueous ink used in the second embodiment of the present invention, it is preferred that the content of organic solvent components having a boiling point of lower than 100° C. in the aqueous ink is not more than 5% by mass, and the static surface tension of the aqueous ink as measured at 20° C. is not less than 23 mN/m and not more than 30 mN/m.

In addition, in the fourth embodiment of the present invention, it is preferred that the aqueous ink contains the pigment, the polymer, a dispersing medium and the surfactant, and an average boiling point of the dispersing medium is not lower than 100° C. and not higher than 122° C.

The furnisher roll 11 is disposed such that an outer peripheral surface of the furnisher roll is immersed in the aqueous ink filled within the ink pan 10. The furnisher roll 11 is rotated in the direction indicated by an arrow shown in FIG. 1, so that the aqueous ink within the ink pan 10 is attached onto the outer peripheral surface of the furnisher roll 11.

The gravure roll 12 is disposed at a position at which the gravure roll 12 is brought into abutting contact with the furnisher roll 11. The gravure roll 12 is formed on a surface thereof with a plurality of cells (recessed portions). When the furnisher roll 11 is rotated while contacting with the gravure roll 12, the aqueous ink adhered onto the outer surface of the furnisher roll 11 is transferred to the respective cells (recessed portions) on the gravure roll 12 and filled in the cells.

In the preferred embodiment as the second embodiment of the present invention, the rubber hardness of the furnisher roll 11 is not less than 55° and not more than 85°, the contact pressure between the furnisher roll 11 and gravure roll 12 is not less than 0.08 MPa and not more than 0.4 MPa, and the rotating speed of the furnisher roll 11 is not less than 4% and not more than 28% on the basis of 100% of the rotating speed of the gravure roll.

The arithmetic mean roughness (Ra) of the plate surface of the gravure roll 12 is not less than 10 nm and not more than 140 nm.

The aqueous ink is preferably filled only in the respective cells of the gravure roll 12. However, a part of the ink fed from the outer surface of the furnisher roll 11 to the gravure roll 12 may be present in the form of an excess ink that is not filled in the respective cells.

When viewed along the rotating direction of the gravure roll 12 (i.e., the direction shown by the arrow in FIG. 1), the doctor blade 13 is disposed on a downstream side of the position at which the furnisher roll 11 and the gravure roll 12 are brought into abutting contact with each other, and also disposed on an upstream side of the position at which the gravure roll 12 and the nip roll 14 are brought into abutting contact with each other.

The doctor blade 13 comes into slide contact with an outer surface of the gravure roll 12, so that the aqueous ink filled in the respective cells of the gravure roll 12 is retained therein as such, whereas the excess ink that is not filled in the respective cells and remains on a convex surface of the gravure roll 12 is scraped off therefrom. At this time, the aqueous ink filled in the respective cells (recessed portions) of the gravure roll 12 is prevented from being scraped off by the doctor blade 13.

In the preferred embodiment as the third embodiment of the present invention, the Vickers hardness of the surface of the doctor blade 13 is not less than 650 Hv and not more than 1000 Hv, the thickness of the edge portion of the doctor blade 13 is not less than 50 μm and not more than 350 μm, and the contact pressure between the doctor blade 13 and the gravure roll 12 is not less than 0.05 MPa and not more than 0.3 MPa.

In the preferred embodiment as the fourth embodiment of the present invention, it is preferred that a plurality of air nozzles 30 are disposed along the doctor blade 13 at the intervals of not less than 50 mm and not more than 200 mm above an upper surface of the doctor blade 13 and on an upstream side of the nip roll 14, and adapted for blowing a hot air having a temperature of not lower than 15° C. and not higher than 45° C. and a relative humidity of not less than 0% and not more than 50% against the plate surface of the gravure roll 12 at an air quantity of not less than 0.05 L/min and not more than 15 L/min, so that the plate surface of the gravure roll 12 is dried while maintaining the ink remaining in the cells (recessed portions) in a non-dried state.

It is preferred that a plurality of suction nozzles 31 are disposed along the air nozzles 30 on the upper surface side of the the air nozzles 30 and on an upstream side of the nip roll 14.

The nip roll 14 comes into abutting contact with the gravure roll 12 via the printing substrate 20 on a downstream side of the position at which the doctor blade 13 abuts against the gravure roll 12 as viewed in the rotating direction of the gravure roll 12. The nip roll 14 cooperates with the gravure roll 12 to pressingly interpose the printing substrate 20 therebetween, so that the aqueous ink filled in the respective cells of the gravure roll 12 is transferred onto the printing substrate 20 that is continuously fed out of the printing substrate feed roll 15 to thereby conduct printing thereon.

It is preferred that the rubber hardness of the nip roll 14 is not less than 55° and not more than 85°, and the contact pressure under which the nip roll 14 is contacted with the printing substrate is not less than 0.04 MPa and not more than 0.35 MPa.

The printing substrate 20 onto which the aqueous ink has been transferred to conduct the printing is then dried by a drying apparatus (not shown). The thus dried printing substrate 20 is taken up around a printing substrate take-up roll 16. Thus, the printing substrate 20 subjected to the gravure printing is obtained in the form of a roll.

The gravure printing press 1 and the gravure printing method are not particularly limited to the aforementioned embodiments, and various modifications and changes can be made and added thereto.

For example, in the case of conducting multi-color gravure printing, there may be used such an embodiment and such a method in which a plurality of printing units which are each constituted of the ink pan 10 for reserving respective color inks, the furnisher roll 11, the gravure roll 12, the doctor blade 13, the nip roll 14, the air nozzles 30, the suction nozzles 31, etc., may be connected in series with each other.

<Gravure Roll>

The arithmetic mean roughness (Ra) of the plate surface of the gravure roll 12 used in the gravure printing method of the present invention is not less than 10 nm and not more than 140 nm.

From the viewpoint of improving transferring properties of the ink and suppressing fogging on the plate surface, the aforementioned arithmetic mean roughness (Ra) is preferably not less than 12 nm, more preferably not less than 15 nm, even more preferably not less than 20 nm and further even more preferably not less than 25 nm, and is also preferably not more than 135 nm, more preferably not more than 130 nm, even more preferably not more than 125 nm and further even more preferably not more than 120 nm.

The arithmetic mean roughness (Ra) as used herein means a surface roughness as measured according to ISO 1997. Concretely, merely a portion with a sampling length is sampled from a measured roughness curve in the direction of a mean line thereof, and a sum of absolute deviation values between the mean line and the measured curve in the sampled portion is calculated to determine an average value thereof. That is, the arithmetic mean roughness (Ra) means an average value of convex and concave irregularities formed when portions of the roughness curve being present below the mean line are folded up on a positive value side of the roughness curve. More specifically, the arithmetic mean roughness (Ra) may be calculated from the data of the roughness curve measured by a surface roughness meter.

In addition, the maximum height (Rz) of the plate surface of the gravure roll is preferably not less than 100 nm, more preferably not less than 110 nm, even more preferably not less than 120 nm and further even more preferably not less than 130 nm, and is also preferably not more than 250 nm, more preferably not more than 240 nm, even more preferably not more than 220 nm and further even more preferably not more than 200 nm, from the viewpoint of improving transferring properties of the ink and suppressing fogging on the plate surface.

The maximum height (Rz) as used herein means a surface roughness measured according to ISO 1997, and represents an average value of sums of Rp and Rv (Rp+Rv) in respective sampling lengths only which are sampled from a roughness curve in the direction of a mean line of the roughness curve, in which Rp represents a height of a highest peak from the mean line, and Rv represents a depth of a deepest valley from the mean line.

The arithmetic mean roughness (Ra) of the plate surface of the gravure roll and the maximum height (Rz) thereof may be measured, for example, using a surface roughness meter "SURFCOM 1400D" manufactured by Tokyo Seimitsu Co., Ltd., and more specifically may be measured by the method described in Examples below.

The plate surface of the gravure roll may be produced by a laser plate making method, an electro-engraving plate making method, etc. It is preferable to form an abrasion-resistant layer on the plate surface of the gravure roll. In addition, it is preferred that the abrasion-resistant layer is subjected to polishing treatment using a polishing paper to suitably control an arithmetic mean roughness (Ra) and a maximum height (Rz) of a surface thereof to the aforementioned respective ranges.

<Furnisher Roll>

In the gravure printing method of the present invention, it is preferable to use the furnisher roll 11 having a rubber hardness of not less than 55° and not more than 85°. The rubber hardness as used herein means the value measured using a rubber hardness tester according to the methods as prescribed in JIS K 6301-1975 and JIS K 7215-1986.

The rubber hardness of the furnisher roll is preferably not less than 58°, more preferably not less than 60° and even more preferably not less than 62°, and is also preferably not more than 83°, more preferably not more than 82° and even more preferably not more than 80°, from the viewpoint of improving transferring properties of the ink and suppressing fogging on the plate surface.

Examples of the material of the furnisher roll 11 include an isoprene rubber (IR), a butadiene rubber (BR), a styrene-butadiene rubber (SBR), an acrylonitrile-butadiene rubber (NBR), an ethylene-propylene rubber (EPDM/EPM), a butyl rubber (IIR), a silicone rubber, a chloroprene rubber (CR), a chloro-sulfonated polyethylene rubber, an acrylic rubber, a hydrin rubber, a urethane rubber, a polysulfide rubber (thiokol), a fluorine rubber and the like.

Among these materials, from the viewpoint of improving transferring properties of the ink and suppressing fogging on the plate surface, preferred is at least one material selected from the group consisting of an acrylonitrile-butadiene rubber (NBR), an ethylene-propylene rubber (EPDM/EPM) and a butyl rubber (IIR).

The rubber thickness of the furnisher roll 11 is preferably not less than 2 mm, more preferably not less than 3 mm and even more preferably not less than 5 mm, and is also preferably not more than 30 mm, more preferably not more than 25 mm and even more preferably not more than 20 mm.

The contact pressure under which the furnisher roll 11 is brought into contact with the gravure roll 12 is preferably not less than 0.08 MPa and not more than 0.4 MPa from the viewpoint of properly supplying the aqueous ink as well as from the viewpoint of improving transferring properties of the ink and suppressing fogging on the plate surface. The aforementioned contact pressure is preferably not less than 0.1 MPa, more preferably not less than 0.15 MPa and even more preferably not less than 0.2 MPa, and is also preferably not more than 0.48 MPa, more preferably not more than 0.46 MPa and even more preferably not more than 0.4 MPa.

The rotating speed of the furnisher roll 11 is preferably not less than 4% and not more than 28% on the basis of 100% of a rotating speed of the gravure roll 12 from the viewpoint of properly supplying the aqueous ink as well as from the viewpoint of improving transferring properties of the ink and suppressing fogging on the plate surface. The rotating speed of the furnisher roll 11 is preferably not less than 5%, more preferably not less than 8% and even more preferably not less than 10%, and is also preferably not more than 25%, more preferably not more than 23% and even more preferably not more than 20%, on the basis of 100% of a rotating speed of the gravure roll 12.

<Doctor Blade>

Figure 2:
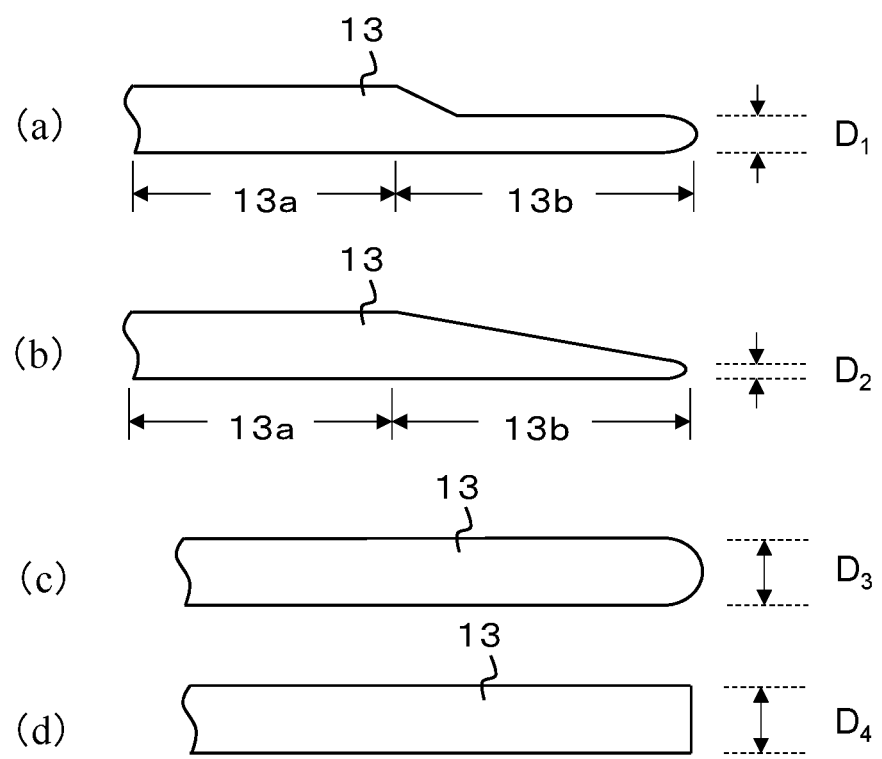
FIG. 2 is an enlarged vertical sectional view showing embodiments of edge shapes of respective doctor blades that may be used in the method of the present invention.

FIG. 2 is an enlarged vertical sectional view showing embodiments of shapes of respective doctor blades 13, in which FIG. 2(a) shows an example of an edge shape of a parallel blade, FIG. 2(b) shows an example of an edge shape of a taper blade, FIG. 2(c) shows an example of an edge shape of a round blade, and FIG. 2(d) shows an example of an edge shape of a square blade.

The shape of the doctor blade 13 is not particularly limited. However, it is preferred that the doctor blade 13 includes a base portion 13a that is formed of a band-shaped steel plate having a thickness of approximately not less than 0.1 mm and not more than 0.60 mm and a width of approximately not less than 40 mm and not more than 80 mm, and a blade edge portion 13 b that is disposed at a tip end portion thereof for scraping off the aqueous ink remaining on the gravure plate 12.

The length of the blade edge portion 13 b of the doctor blade 13 is preferably not less than 0.5 mm and not more than 5 mm.

The respective thicknesses D1 through D4 of the blade edge portion 13 b of the doctor blade 13 are preferably not less than 50 μm and not more than 350 μm from the viewpoint of ensuring adequate strength and flexibility of the blade edge. The thickness of the blade edge portion 13 b is preferably not less than 55 μm, more preferably not less than 60 μm and even more preferably not less than 70 μm, and is also preferably not more than 320 μm, more preferably not more than 300 μm, even more preferably not more than 250 μm and further even more preferably not more than 200 μm.

Examples of the base material of the doctor blade 13 include a soft steel, a stainless steel, a plastic material, etc. Among these materials, a steel material having high processing accuracy and good elasticity and toughness is preferably used.

The Vickers hardness of a surface of the doctor blade 13 (blade edge portion 13b) is preferably not less than 650 Hv and not more than 1000 Hv from the viewpoint of improving flexibility at the blade edge portion 13b, reducing abrasion thereof upon contact with the gravure plate 12, and suppressing fogging on the plate surface. The Vickers hardness of a surface of the doctor blade 13 is preferably not less than 700 Hv, more preferably 750 Hv and even more preferably 800 Hv, and is also preferably not more than 980 Hv, more preferably not more than 950 Hv and even more preferably not more than 920 Hv.

The Vickers hardness is an index representing a hardness of a substance which is, in general, extensively applied to metal materials, and is prescribed by the method described in JIS Z 2244: 2009, ISO 6507. More specifically, the Vickers hardness is determined from a stress per a unit surface area of a sample which is calculated from an average value of lengths of diagonals of an indentation formed on a surface of the sample when indenting the surface of the sample with a diamond indenter in the form of a right pyramid having an opposite angle of 136[°] under a predetermined load. The apparatus used for measuring the Vickers hardness is not particularly limited, and an ordinary measuring device used for measurement of the Vickers hardness may be used in the present invention.

The blade edge portion 13b may be provided thereon with a plated layer for protecting a surface of a base material thereof. As the plated layer, there may be mentioned a nickel plated layer, a composite plated layer formed of nickel and a ceramic material, a ceramic plated layer, a composite plated layer formed of a ceramic material and a fluororesin, and the like. Examples of the ceramic material include oxides such as $Cr_2O_3$, $TiO_2$, $Al_2O_3$, etc., nitrides such as TiN, $Si_3N_4$, AlN, etc., carbides such as CrC, TiC, SiC, etc., and the like.

The contact pressure between the doctor blade 13 and the gravure plate 12 is preferably not less than 0.04 MPa and not more than 0.35 MPa from the viewpoint of reducing abrasion of these elements by contact therebetween and suppressing fogging on the plate surface. The contact pressure is preferably not less than 0.05 MPa, more preferably not less than 0.08 MPa and even more preferably not less than 0.1 MPa, and is also preferably not more than 0.32 MPa, more preferably not more than 0.3 MPa and even more preferably not more than 0.28 MPa.

<Air Nozzles>

In the method of the present invention, it is preferred that air is blown from air nozzles 30 against the plate surface of the gravure roll 12 to forcibly dry the aqueous ink film remaining on the plate surface of the gravure roll 12 without being scraped off by the doctor blade 13.

The aqueous ink film on the plate surface of the gravure roll 12 which has been forcibly dried is free of transfer to the printing substrate 20 even when being pressed by the nip roll 14 disposed in the rotating direction thereof, so that it is possible to suppress fogging on the plate surface.

In the air nozzles 30, a plurality of air nozzles are provided at the predetermined intervals therebetween in approximately parallel with the doctor blade 13, so that it is possible to blow air against the plate surface of the gravure roll in an approximately uniform manner.

The distance between the tip end of the respective air nozzles 30 and the plate surface of the gravure roll 12 is preferably not less than 10 mm, more preferably not less than 20 mm and even more preferably not less than 30 mm, and is also preferably not more than 100 mm, more preferably not more than 80 mm and even more preferably not more than 70 mm.

The quantity of the hot air blown from the air nozzles 30 against the plate surface of the gravure roll is preferably not less than 0.05 L/min and not more than 15 L/min. When the hot air quantity is less than 0.05 L/min, no effect tends to be attained by the provision of the air nozzles 30, whereas when the hot air quantity is more than 15 L/min, even the ink filled in the cells formed on the plate surface of the gravure roll is dried, so that the amount of the ink transferred tends to be reduced to cause reduction in optical density of the printed images. In addition, when the hot air quantity is more than 15 L/min, the aqueous ink film on the plate surface of the gravure roll is excessively dried, and can be no longer redispersed by a fresh aqueous ink within the ink pan 10, so that the dried ink forms ink scums and results in undesirable formation of streak unevenness.

From the same viewpoint as described above, the quantity of the hot air blown against the plate surface of the gravure roll is preferably not less than 0.07 L/min, more preferably not less than 0.5 L/min, even more preferably not less than 1.0 L/min and further even more preferably not less than 1.3 L/min, and is also preferably not more than 12 L/min, more preferably not more than 10 L/min, even more preferably not more than 7 L/min and further even more preferably not more than 4 L/min.

The temperature of the hot air blown from the air nozzles 30 against the plate surface of the gravure roll is preferably not lower than 15° C., more preferably not lower than 20° C. and even more preferably not lower than 25° C., and is also preferably not higher than 45° C., more preferably not higher than 40° C. and even more preferably not higher than 35° C., from the same viewpoint as described above.

In addition, from the same viewpoint as described above, the relative humidity of the hot air is preferably not less than 0%, more preferably not less than 1%, even more preferably not less than 5% and further even more preferably not less than 10%, and is also preferably not more than 50%, more preferably not more than 45%, even more preferably not more than 40% and further even more preferably not more than 35%.

In addition, the velocity of the hot air blown against the plate surface of the gravure roll is preferably not less than 0.2 m/s, more preferably not less than 0.3 m/s and even more preferably not less than 0.5 m/s, and is also preferably not more than 2.0 m/s, more preferably not more than 1.8 m/s and even more preferably not more than 1.6 m/s, from the same viewpoint as described above.

The pore diameter of the respective air nozzles is preferably not less than 2 mmϕ, more preferably not less than 3 mmϕ and even more preferably not less than 4 mmϕ, and is also preferably not more than 12 mmϕ, more preferably not more than 10 mmϕ and even more preferably not more than 9 mmϕ, from the same viewpoint as described above.

The width of the gravure roll is generally not less than 600 mm and not more than 1300 mm. The interval between the adjacent air nozzles disposed is preferably not less than 30 mm, more preferably not less than 35 mm, even more preferably not less than 40 mm and further even more preferably not less than 45 mm, and is also preferably not more than 250 mm, more preferably not more than 240 mm, even more preferably not more than 230 mm and further even more preferably not more than 220 mm, from the same viewpoint as described above.

<Suction Nozzles>

The suction nozzles 31 are preferably disposed on the side of an upper surface of the air nozzles 30 and on a upstream side of the nip roll 14 from the viewpoint of efficiently drying the plate surface of the gravure plate 12 without drying the ink remaining within the cells (recessed portions).

The suction nozzles 31 include a plurality of nozzles that are arranged at the predetermined intervals in approximately parallel with the upper surface of the air nozzles, so that it is possible to suck the air blown against the plate surface of the gravure roll in an approximately uniform manner.

The amount of the air sucked by the suction nozzles 31 from the plate surface of the gravure roll is preferably not less than 0.05 L/min, more preferably not less than 0.07 L/min, even more preferably not less than 0.5 L/min, further even more preferably not less than 1.0 L/min and still further even more preferably not less than 1.3 L/min, and is also preferably not more than 15 L/min, more preferably not more than 12 L/min, even more preferably not more than 10 L/min, further even more preferably not more than 7 L/min and still further even more preferably not more than 4 L/min, from the viewpoint of improving transferring properties of the ink and suppressing fogging on the plate surface.

The velocity of the air sucked from the plate surface of the gravure roll is preferably not less than 0.2 m/s, more preferably not less than 0.3 m/s and even more preferably not less than 0.5 m/s, and is also preferably not more than 2.0 m/s, more preferably not more than 1.8 m/s and even more preferably not more than 1.6 m/s, from the same viewpoint as described above.

The distance between the tip end of the respective suction nozzles 31 and the plate surface of the gravure roll 12 is preferably not less than 10 mm, more preferably not less than 20 mm and even more preferably not less than 30 mm, and is also preferably not more than 100 mm, more preferably not more than 80 mm and even more preferably not more than 70 mm, from the same viewpoint as described above.

The pore diameter of the respective suction nozzles is preferably not less than 2 mmϕ, more preferably not less than 3 mmϕ and even more preferably not less than 4 mmϕ, and is also preferably not more than 12 mmϕ, more preferably not more than 10 mmϕ and even more preferably not more than 9 mmϕ, from the same viewpoint as described above.

The width of the gravure roll is generally not less than 600 mm and not more than 1300 mm. The interval between the adjacent suction nozzles disposed is preferably not less than 30 mm, more preferably not less than 35 mm, even more preferably not less than 40 mm and further even more preferably not less than 45 mm, and is also preferably not more than 250 mm, more preferably not more than 240 mm, even more preferably not more than 230 mm and further even more preferably not more than 220 mm, from the same viewpoint as described above.

<Nip Roll>

In the gravure printing method of the present invention, it is preferable to use the nip roll 14 having a rubber hardness of not less than 55° and not more than 85°. The rubber hardness as used herein means the value measured using a rubber hardness tester according to the methods as prescribed in JIS K 6301-1975 and JIS K 7215-1986.

The rubber hardness of the nip roll 14 is preferably not less than 58°, more preferably not less than 60° and even more preferably not less than 62°, and is also preferably not more than 83°, more preferably not more than 82° and even more preferably not more than 80°, from the viewpoint of improving transferring properties of the ink and suppressing fogging on the plate surface.

Examples of the material of the nip roll 14 include an isoprene rubber (IR), a butadiene rubber (BR), a styrene-butadiene rubber (SBR), an acrylonitrile-butadiene rubber (NBR), an ethylene-propylene rubber (EPDM/EPM), a butyl rubber (IIR), a silicone rubber, a chloroprene rubber (CR), a chloro-sulfonated polyethylene rubber, an acrylic rubber, a hydrin rubber, a urethane rubber, a polysulfide rubber (thiokol), a fluorine rubber and the like.

Among these materials, from the viewpoint of improving transferring properties of the aqueous ink and suppressing fogging on the plate surface, preferred is at least one material selected from the group consisting of an acrylonitrile-butadiene rubber (NBR), an ethylene-propylene rubber (EPDM/EPM) and a butyl rubber (IIR).

The rubber thickness of the nip roll 14 is preferably not less than 2 mm, more preferably not less than 3 mm and even more preferably not less than 5 mm, and is also preferably not less than 30 mm, more preferably not more than 25 mm and even more preferably not more than 20 mm.

The nip roll 14 is brought into abutting contact with the gravure roll 12 via a printing substrate 20. The contact pressure under which the nip roll 14 is contacted with the printing substrate 20 is preferably not less than 0.04 MPa and not more than 0.35 MPa from the viewpoint of improving transferring properties of the ink and suppressing fogging on the plate surface. The aforementioned contact pressure is preferably not less than 0.05 MPa, more preferably not less than 0.08 MPa and even more preferably not less than 0.1 MPa, and is also preferably not more than 0.32 MPa, more preferably not more than 0.3 MPa and even more preferably not more than 0.28 MPa.

<Printing Substrate>

Examples of the printing substrate used in the gravure printing method include papers such as a coated paper, an art paper, a synthetic paper, a processed paper, etc.; resin films such as a polyester film, a polyethylene film, a polypropylene film, a polystyrene film, a vinyl chloride film, a nylon film, etc.; and the like. Of these printing substrates, from the viewpoint of good versatility thereof, preferred are the resin films. In addition, from the viewpoint of improving suitability to after-processing treatments such as punching treatment after producing a printed material, etc., more preferred are a polyester film, a monoaxially oriented or biaxially oriented polypropylene film, etc.

In addition, from the viewpoint of improving gravure printability, there are more preferably used surface-treated resin films that are obtained by subjecting the aforementioned polyester film and monoaxially oriented or biaxially oriented polypropylene film, etc., to discharge processing treatments such as corona discharge treatment, plasma discharge treatment. etc.

The thickness of the printing substrate is preferably not less than 10 μm and more preferably not less than 12 μm, and is also preferably not more than 100 μm, more preferably not more than 60 μm and even more preferably not more than 40 μm, from the viewpoint of improving transferring properties of the ink and suppressing fogging on the plate surface.

<Aqueous Ink>

The aqueous ink used in the present invention (hereinafter also referred to merely as an "ink") contains a pigment, a polymer, an organic solvent, a surfactant and water.

The "aqueous ink" as used herein means an ink in the form of an aqueous solution or a water dispersion prepared by using water or a mixture of water and an organic solvent as a diluent.

In the following, the respective components contained in the aqueous ink are explained.

<Pigment>

The pigment used in the aqueous ink may be either an inorganic pigment and an organic pigment.

Examples of the inorganic pigment include carbon blacks, metal oxides and the like. The carbon blacks are preferably used for black inks. The carbon blacks may include furnace blacks, thermal lamp blacks, acetylene blacks, channel blacks and the like. As a pigment for white inks, there may be used metal oxides such as titanium dioxide, zinc oxide, silica, alumina and magnesium oxide, etc. These inorganic pigments may be subjected to surface treatments with conventionally known hydrophobilizing agents such as a titanium coupling agent, a silane coupling agent, a higher fatty acid metal salt and the like.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like.

The hue of these pigments used is not particularly limited. In chromatic inks, there may be used any of chromatic pigments having a yellow color, a magenta color, a cyan color, a red color, a blue color, an orange color, a green color, etc.

The pigment used herein is preferably in the form of at least one pigment selected from the group consisting of a self-dispersible pigment, and pigment particles dispersed with a polymer, and more preferably in the form of the pigment particles dispersed with a polymer (hereinafter also referred to merely as "pigment particles A").

The self-dispersible pigment as used herein means a pigment onto a surface of which at least one hydrophilic functional group is bonded either directly or through the other atom group to thereby render the pigment dispersible in an aqueous medium without using a surfactant or a resin. In order to form a pigment into a self-dispersible pigment, for example, a necessary amount of the hydrophilic functional group may be chemically bonded to the surface of the pigment by an ordinary method.

The content of the pigment in the ink is preferably not less than 2% by mass, more preferably not less than 5% by mass and even more preferably not less than 8% by mass, and is also preferably not more than 30% by mass, more preferably not more than 25% by mass and even more preferably not more than 20% by mass, from the viewpoint of enhancing optical density of the resulting ink upon printing.

<Polymer>

The polymer used in the aqueous ink is preferably in the form of either a water-soluble polymer or a water-insoluble polymer. Of these polymers, preferred is the water-insoluble polymer.

The water-soluble polymer as used herein means such a polymer that when the polymer is dried to a constant weight at 105° C. for 2 hours and then dissolved in 100 g of water at 25° C., the solubility in water of the polymer is not less than 10 g. The water-insoluble polymer as used herein means such a polymer whose solubility in water as defined above is less than 10 g.

Examples of the polymer used include polyesters, polyurethanes, vinyl-based polymers and the like. Among these polymers, from the viewpoint of improving dispersion stability of the pigment in the resulting ink, preferred are vinyl-based polymers obtained by addition-polymerizing a vinyl monomer such as a vinyl compound, a vinylidene compound, a vinylene compound and the like.

Specific examples of commercially available products of the vinyl-based polymers include polyacrylic acids such as "ARON AC-10SL" available from Toagosei Co., Ltd., and styrene-acrylic resins such as "JONCRYL 67", "JONCRYL 611", "JONCRYL 678", "JONCRYL 680" and "JONCRYL 690" all available from BASF Japan, Ltd., and the like.

The polymer used herein is preferably dispersed in the aqueous ink in the form of the pigment particles A dispersed with the polymer (pigment particles A), or in the form of pigment-free polymer particles B. In the following, the polymer constituting the pigment particles A is also referred to as a "polymer (a)", and the polymer constituting the pigment-free polymer particles B is also referred to as a "polymer (b)".

The content of the polymer (a sum of the polymer (a) and the polymer (b)) in the aqueous ink is preferably not less than 3% by mass, more preferably not less than 5% by mass and even more preferably not less than 7% by mass, and is also preferably not more than 30% by mass, more preferably not more than 25% by mass and even more preferably not more than 20% by mass, from the viewpoint of improving dispersibility and fixing properties of the pigment.

[Polymer (a)] The polymer (a) is a polymer having a capability of dispersing the pigment. Examples of the polymer (a) include polyesters, polyurethanes, vinyl-based polymers and the like. Among these polymers, from the viewpoint of improving stability of the resulting ink, preferred are the vinyl-based polymers obtained by addition-polymerizing a vinyl monomer.

The vinyl-based polymer preferably contains a constitutional unit derived from (a1) an ionic monomer and a constitutional unit derived from (a2) a nonionic monomer.

The ionic monomer (a1) is preferably an anionic monomer. Examples of the anionic monomer include carboxylic acid monomers, sulfonic acid monomers and the like. Among these monomers, preferred are carboxylic acid monomers, more preferred is at least one monomer selected from the group consisting of acrylic acid and methacrylic acid.

The nonionic monomer (a2) is in the form of a monomer having a high affinity to water or a water-soluble organic solvent. As the nonionic monomer (a2), preferred are a polyalkylene glycol (meth)acrylate and an alkoxy polyalkylene glycol (meth)acrylate, and more preferred is methoxy polyethylene glycol (n=1 to 30) (meth)acrylate. Specific examples of commercially available products of the nonionic monomer include "NK ESTER M" series products available from Shin-Nakamura Chemical Co., Ltd.; "BLEMMER PE" series products, "BLEMMER PME" series products, "BLEMMER 50PEP" series products, "BLEMMER 50POEP" series products, etc., all available from NOF Corporation; and the like.

The polymer (a) may further contain a constitutional unit derived from (a3) a hydrophobic monomer. Examples of the hydrophobic monomer (a-3) include alkyl (meth)acrylates, aromatic group-containing monomers, macromonomers containing a polymerizable functional group at one terminal end thereof, and the like.

The alkyl (meth)acrylates are preferably those alkyl (meth)acrylates containing containing an alkyl group having not less than 6 and not more than 18 carbon atoms. Examples of the alkyl (meth)acrylates include methyl (meth) acrylate, ethyl (meth)acrylate, (iso)propyl (meth) acrylate, (iso- or tert-)butyl (meth) acrylate, cyclohexyl (meth)acrylate, 2-ethylhexyl (meth)acrylate, (iso)octyl (meth)acrylate, and the like.

As the aromatic group-containing monomers, preferred are vinyl-based monomers containing an aromatic group having not less than 6 and not more than 22 carbon atoms, and more preferred are styrene-based monomers, aromatic group-containing (meth)acrylates and the like. Examples of the preferred styrene-based monomers include styrene, 2-methyl styrene, α-methyl styrene, vinyl toluene, divinyl benzene and the like. Examples of the preferred aromatic group-containing (meth) acrylates include benzyl (meth) acrylate and the like.

(Contents of Respective Constitutional Units in Polymer (a))

The contents of the constitutional units derived from the components (a1) to (a3) in the polymer (a) are as follows from the viewpoint of improving dispersion stability of the resulting ink.

The content of the component (a1) is preferably not less than 5% by mass, more preferably not less than 10% by mass and even more preferably not less than 15% by mass, and is also preferably not more than 40% by mass, more preferably not more than 30% by mass and even more preferably not more than 20% by mass.

The content of the component (a2) is preferably not less than 20% by mass, more preferably not less than 40% by mass and even more preferably not less than 60% by mass, and is also preferably not more than 95% by mass, more preferably not more than 90% by mass and even more preferably not more than 85% by mass.

The content of the component (a3) is preferably not more than 15% by mass, more preferably not more than 10% by mass and even more preferably not more than 5% by mass.

(Production of Polymer (a)) The aforementioned polymer (a) may be produced by copolymerizing a monomer mixture containing the ionic monomer (a1), the nonionic monomer (a2), etc., by a known solution polymerization method and the like.

The weight-average molecular weight of the polymer (a) is preferably not less than 3,000, more preferably not less than 5,000 and even more preferably not less than 10,000, and is also preferably not more than 100,000, more preferably not more than 50,000 and even more preferably not more than 30,000, from the viewpoint of improving dispersion stability of the resulting ink as well as from the viewpoint of improving fixing properties of the ink to the printing substrate.

The acid value of the polymer (a) is preferably not less than 100 mgKOH/g, more preferably not less than 150 mgKOH/g and even more preferably not less than 200 mgKOH/g, and is also preferably not more than 350 mgKOH/g, more preferably not more than 300 mgKOH/g and even more preferably not more than 250 mgKOH/g, from the viewpoint of improving dispersibility of the pigment and adsorptivity of the polymer to the pigment.

Meanwhile, the weight-average molecular weight and the acid value may be measured by the methods described in Examples below.

(Production of Pigment Particles A Dispersed with Polymer)

The pigment particles A dispersed with the polymer are in the form of particles formed by adsorbing the polymer (a) onto the surface of the pigment, so that the pigment can be stably dispersed in the ink.

The pigment particles A can be efficiently produced in the form of a dispersion thereof by a process including the following step I, and may also be produced by a process further including, in addition to the step I, the following steps II and III.

Step I; subjecting a mixture containing the polymer (a), an organic solvent and the pigment, if required together with a neutralizing agent, a surfactant, etc., to dispersion treatment to thereby obtain a dispersion of the pigment particles A;

Step II; removing the organic solvent from the dispersion obtained in the step I to thereby obtain a water dispersion of the pigment particles A; and Step III; mixing the dispersion obtained in the step I or the water dispersion obtained in the step II with a crosslinking agent to subject the dispersion to crosslinking treatment, thereby obtaining a water dispersion of the pigment-containing polymer (a) particles (pigment particles A).

Incidentally, the polymer (a) of the pigment particles A may be either the same as or different from the polymer (b) of the polymer particles B. That is, the polymers (a) and (b) may be different in composition thereof from each other. Alternatively, the polymers (a) and (b) may be identical to each other inclusive of their composition, but may be different from each other merely as to presence or non-presence of the pigment therein.

In the case where the polymer (a) is an anionic polymer, anionic groups contained in the polymer may be neutralized using a neutralizing agent. When using the neutralizing agent, the anionic groups contained in the polymer is preferably neutralized such that the pH value of the dispersion obtained by the neutralization falls within the range of not less than 7 and not more than 11. Examples of the neutralizing agent include bases such as lithium hydroxide, sodium hydroxide, potassium hydroxide, ammonia, various amines and the like. In addition, the polymer may be previously neutralized.

The neutralization degree of the anionic groups in the polymer (a) is preferably not less than 10 mol % and not more than 100 mol %, more preferably not less than 20 mol % and not more than 90 mol % and even more preferably not less than 30 mol % and not more than 80 mol %, on the basis of the anionic groups, from the viewpoint of improving dispersion stability of the resulting ink.

In the case where the polymer (a) is an anionic polymer containing anionic groups, the crosslinking agent is preferably in the form of a compound containing a functional group that is capable of reacting with the anionic groups of the polymer (a), more preferably a compound containing the two or more functional groups in a molecule thereof, and even more preferably a compound containing the not less than 2 and not more than 6 functional groups in a molecule thereof.

Suitable examples of the crosslinking agent include compounds containing two or more epoxy groups in a molecule thereof, compounds containing two or more oxazoline groups in a molecule thereof, and compounds containing two or more isocyanate groups in a molecule thereof. Among these crosslinking agents, preferred are the compounds containing two or more epoxy groups in a molecule thereof, and more preferred is trimethylolpropane polyglycidyl ether.

The crosslinking rate of acid components in the polymer (a) is preferably not less than 5 mol %, more preferably not less than 10 mol % and even more preferably not less than 20 mol %, and is also preferably not more than 80 mol %, more preferably not more than 70 mol % and even more preferably not more than 60 mol %, from the viewpoint of improving storage stability of the resulting ink.

The content of the pigment particles A in the ink is preferably not less than 1% by mass, more preferably not less than 3% by mass and even more preferably not less than 5% by mass, and is also preferably not more than 40% by mass, more preferably not more than 35% by mass and even more preferably not more than 30% by mass, from the viewpoint of enhancing optical density of the resulting ink upon printing as well as improving fixing properties of the ink.

The content of the polymer (a) in the ink is preferably not less than 0.1% by mass, more preferably not less than 0.2% by mass and even more preferably not less than 0.3% by mass, and is also preferably not more than 10% by mass, more preferably not more than 5% by mass and even more preferably not more than 2% by mass, from the viewpoint of improving fixing properties of the resulting ink.

The mass ratio of the polymer (a) to the pigment [polymer (a)/pigment] in the ink is preferably from 0.2/99.8 to 70/30, more preferably from 0.5/99.5 to 60/40 and even more preferably from 1/99 to 50/50, from the viewpoint of improving stability of the resulting ink.

(Pigment-Free Polymer Particles B)

The aqueous ink preferably contains pigment-free polymer particles B (polymer particles B) from the viewpoint of forming a film of the ink on the printing substrate to thereby improve fixing properties of the ink. The polymer particles B contain no pigment and are in the form of water-insoluble polymer particles constituted of a polymer solely.

Examples of a polymer (b) constituting the polymer particles B include acrylic resins, styrene-based resins, urethane-based resins, polyester-based resins, styrene-acrylic resins, butadiene-based resins, vinyl chloride-based resins, and the like. Among these resins, from the viewpoint of improving transfer properties of the ink and suppressing fogging on the plate surface, preferred are acrylic resins and vinyl chloride-acrylic resins, and also preferred is a combination of the acrylic resin and the vinyl chloride-acrylic resin.

The polymer particles B are preferably used in the form of a water dispersion prepared by dispersing the polymer particles B in water. The polymer particles B used herein may be either an appropriately synthesized product or a commercially available product.

[Polymer (b)]

The aforementioned acrylic resin is preferably a water-insoluble vinyl-based polymer that is produced by copolymerizing a monomer mixture B containing (b1) an ionic monomer and (b2) a hydrophobic monomer.

Examples of the component (b1) include the same monomers as the aforementioned component (a1). Among these monomers, from the viewpoint of improving dispersion stability of the resulting ink, preferred are anionic monomers, more preferred are carboxylic acid monomers, and even more preferred is at least one monomer selected from the group consisting of acrylic acid and methacrylic acid.

Examples of the component (b2) include the same alkyl (meth)acrylates, aromatic group-containing monomers and macromonomers as described above as to the aforementioned component (a3), etc. Among these monomers, preferred are alkyl (meth)acrylates; more preferred are those alkyl (meth)acrylates containing an alkyl group having not less than 1 and not more than 22 carbon atoms and preferably not less than 1 and not more than 10 carbon atoms; even more preferred are those compounds exemplified above; and further even more preferred is a combination of methyl (meth)acrylate and 2-ethylhexyl (meth) acrylate.

(Contents of Respective Constitutional Units in Polymer (b))

The contents of the constitutional units derived from the components (b-1) and (b-2) in the polymer (b) are as follows from the viewpoint of improving fixing properties of the ink on the printing substrate.

The content of the component (b1) is preferably not less than 1% by mass, more preferably not less than 3% by mass and even more preferably not less than 5% by mass, and is also preferably not more than 30% by mass, more preferably not more than 20% by mass and even more preferably not more than 15% by mass.

The content of the component (b2) is preferably not less than 50% by mass, more preferably not less than 60% by mass and even more preferably not less than 70% by mass, and is also preferably not more than 99% by mass, more preferably not more than 97% by mass and even more preferably not more than 95% by mass.

The polymer (b) may be produced by copolymerizing a monomer mixture containing the ionic monomer (b1), the nonionic monomer (b2) and the like by a known solution polymerization method, etc.

Examples of commercially available products of the dispersion of the polymer particles B include dispersions of acrylic resins such as "Neocryl A1127" (anionic self-crosslinkable aqueous acrylic resin) available from DSM Neo-Resins, Inc., and "JONCRYL 390" available from BASF Japan, Ltd., etc.; urethane-based resins such as "WBR-2018" available from Taisei Fine Chemical Co., Ltd., etc.; styrene-butadiene resins such as "SR-100" available from Nippon A & L Inc., etc.; styrene-acrylic resins such as "JONCRYL 7100", "JONCRYL 734" and "JONCRYL 538" all available from BASF Japan, Ltd., etc.; and vinyl chloride-acrylic resins such as "VINYBLAN 700" and "VINYBLAN 701" both available from Nissin Chemical Co., Ltd., etc.

The weight-average molecular weight of the polymer (b) is preferably not less than 100,000, more preferably not less than 200,000 and even more preferably not less than 300,000, and is also preferably not more than 2,500,000, more preferably not more than 1,000,000 and even more preferably not more than 600,000, from the viewpoint of improving fixing properties of the resulting ink.

The acid value of the polymer (b) is preferably not less than 1 mgKOH/g, more preferably not less than 3 mgKOH/g and even more preferably not less than 5 mgKOH/g, and is also preferably not more than 70 mgKOH/g, more preferably not more than 65 mgKOH/g and even more preferably not more than 60 mgKOH/g, from the viewpoint of improving stability of the resulting ink.

Meanwhile, the weight-average molecular weight and the acid value of the polymer (b) may be measured by the methods described in Examples below.

The content of the polymer particles B in the ink is preferably not less than 1% by mass, more preferably not less than 3% by mass and even more preferably not less than 5% by mass, and is also preferably not more than 30% by mass, more preferably not more than 20% by mass and even more preferably not more than 15% by mass, from the viewpoint of improving fixing properties of the resulting ink.

The mass ratio of the polymer (a sum of the polymer (a) and the polymer (b)) to the pigment [polymer/pigment] in the ink is preferably from 20/100 to 300/100, more preferably from 30/100 to 200/100 and even more preferably from 40/100 to 100/100, from the viewpoint of improving stability of the resulting ink.

<Dispersing Medium>

The dispersing medium used in the aqueous ink contains an organic solvent and water.

The average boiling point of the dispersing medium is preferably not lower than 100° C. and not higher than 122° C. from the viewpoint of improving transferring properties of the ink and suppressing fogging on the plate surface.

The average boiling point of the dispersing medium means a weighted mean value of boiling points of respective components of the dispersing medium such as the organic solvent, water, etc., contained in the aqueous ink, which are weighted by contents (% by mass) thereof.

From the viewpoint of improving drying properties of the ink, the average boiling point of the dispersing medium is preferably not lower than 102° C., more preferably not lower than 105° C. and even more preferably not lower than 110° C., and is also preferably not higher than 121° C., more preferably not higher than 120° C. and even more preferably not higher than 115° C.

<Organic Solvent>

The organic solvent used in the aqueous ink is preferably a water-soluble organic solvent. The water-soluble organic solvent may be present in the form of either a liquid or a solid at an ordinary temperature. The water-soluble organic solvent as used herein means an organic solvent having a solubility in water of not less than 10 mL as measured by dissolving the organic solvent in 100 mL of water at 25° C.

The boiling point of the organic solvent is not lower than 100° C., preferably not lower than 110° C., more preferably not lower than 115° C. and even more preferably not lower than 118° C., and is also not higher than 260° C., preferably not higher than 250° C., more preferably not higher than 240° C. and even more preferably not higher than 235° C., from the viewpoint of improving transferring properties of the ink and suppressing fogging on the plate surface.

The "boiling point" as used herein represents a standard boiling point (boiling point as measured at 1 atm). In the case where the organic solvent used herein contains two or more organic solvent components, the boiling point of the organic solvent means a weighted mean value of boiling points of the two or more organic solvent components which are weighted by contents (% by mass) of the respective water-soluble organic solvent components contained in the organic solvent.

The content of the organic solvent components having a boiling point of not lower than 100° C. and not higher than 260° C. as used in the aqueous ink is not less than 0.3% by mass, preferably not less than 1% by mass, more preferably not less than 2% by mass and even more preferably not less than 3% by mass from the viewpoint of improving transferring properties of the ink and suppressing fogging on the plate surface, and is also not more than 12% by mass, preferably not more than 11% by mass, more preferably not more than 10% by mass and even more preferably not more than 9% by mass from the viewpoint of reducing environmental burdens.

The aqueous ink may also contain organic solvent components having a boiling point of lower than 100° C. However, the content of the organic solvent components having a boiling point of lower than 100° C. in the aqueous ink is preferably not more than 5% by mass, more preferably not more than 3% by mass and even more preferably not more than 1% by mass from the viewpoint of improving transferring properties of the ink and suppressing fogging on the plate surface while suppressing drying properties of the ink.

Examples of the organic solvent components having a boiling point of lower than 100° C. include monohydric alcohols such as ethanol, isopropyl alcohol, n-propyl alcohol, etc.

The SP (solubility parameter) value of the organic solvent is preferably not less than 8 $(MPa)^{1/2}$ and not more than 11 $(MPa)^{1/2}$ from the viewpoint of improving transferring properties of the ink and suppressing fogging on the plate surface.

As the solubility parameter, there is used a Hansen SP value. The Hansen SP value used herein may be calculated from three kinds of energy parameters obtained by dividing an interaction energy acting between molecules of substances on the basis of chemical structures thereof. More specifically, the Hansen SP value used herein may be calculated according to the following equation:

$$\delta = (\delta_d^2 + \delta_p^2 + \delta_h^2)^{1/2}$$

wherein $\delta_d$ is a London dispersion force item, $\delta_p$ is a molecular polarization item, and $\delta_h$ is a hydrogen bonding item. The details of $\delta_d$, $\delta_p$ and $\delta_h$ of the respective water-soluble organic solvents are described more specifically in "HANSEN SOLUBILITY PARAMETERS", A User' Handbook, Second Edition.

In addition, if the SP value is not determined by the aforementioned method, there may also be used the value described in "Solubility Parameter Values" VII, pp. 675-714 of "Polymer Handbook, Fourth Edition", published in 1999 by John Wiley & Sons, Inc., etc.

The SP value of the organic solvent is preferably not less than 8.2 $(MPa)^{1/2}$, more preferably not less than 8.3 $(MPa)^{1/2}$ and even more preferably not less than 8.5 $(MPa)^{1/2}$, and is also preferably not more than 10.8 $(MPa)^{1/2}$, more preferably not more than 10.6 $(MPa)^{1/2}$ and even more preferably not more than 10.4 $(MPa)^{1/2}$, from the viewpoint of improving transferring properties of the ink and suppressing fogging on the plate surface.

Examples of the preferred water-soluble organic solvent include polyhydric alcohols such as propylene glycol, glycerin, etc., polyhydric alcohol ethers, nitrogen-containing heterocyclic compounds, amides, amines and the like. Of these water-soluble organic solvents, preferred are glycol ethers.

As the aforementioned glycol ethers, there may be mentioned alkylene glycol monoalkyl ethers and alkylene glycol dialkyl ethers. The number of carbon atoms of an alkyl group contained in the aforementioned alkylene glycol monoalkyl ethers and alkylene glycol dialkyl ethers is not less than 1 and preferably not less than 2, and is also preferably not more than 6, more preferably not more than 4 and even more preferably not more than 3.

Among these glycol ethers, preferred are ethylene glycol monomethyl ether, ethylene glycol monoisopropyl ether, ethylene glycol monobutyl ether, diethylene glycol monomethyl ether, diethylene glycol monoisopropyl ether, diethylene glycol monobutyl ether, diethylene glycol monoisobutyl ether, triethylene glycol monomethyl ether, propylene glycol monomethyl ether, etc.;

and more preferred is at least one compound selected from the group consisting of ethylene glycol monomethyl ether (boiling point (b.p.): 125° C.), ethylene glycol monoisopropyl ether (b.p.; 142° C.), ethylene glycol monobutyl ether (b.p.: 171° C.), diethylene glycol monoisobutyl ether (b.p.: 220° C.), propylene glycol monomethyl ether (b.p.: 121° C.) and triethylene glycol monomethyl ether (b.p.: 249° C.).

<Surfactant>

The surfactant used in the aqueous ink is not particularly limited. From the viewpoint of improving transferring properties of the ink and suppressing fogging on the plate surface, a silicone-based surfactant and an acetylene glycol-based surfactant are preferably used.

As the silicone-based surfactant, a polyether-modified silicone-based surfactant is preferably used. The polyether-modified silicone-based surfactant has such a structure that a hydrocarbon group bonded to a side chain and/or a terminal end of a silicone oil is substituted with a polyether group. Examples of the suitable polyether group of the polyether-modified silicone-based surfactant include a polyethyleneoxy group, a polypropyleneoxy group and a polyalkyleneoxy group formed by addition-bonding an ethyleneoxy group (EO) and a propyleneoxy group (PO) to each other in a block form or a random form. More specifically, as the polyether-modified silicone-based surfactant, there may be used a compound formed by grafting a polyether group to a main chain of a silicone, a compound formed by bonding a silicone and a polyether group to each other in a block form, etc.

Specific examples of the polyether-modified silicone-based surfactant include "KF" series products available from Shin-Etsu Chemical Co., Ltd., "SILFACE SAG" available from Nissin Chemical Co., Ltd., and "BYK" series products available from BYK Chemie Japan K.K., and the like.

As the acetylene glycol-based surfactant, preferred are an acetylene glycol containing not less than 8 and not more than 22 carbon atoms and an ethylene adduct of the acetylene glycol, and more preferred is the acetylene glycol containing not less than 8 and not more than 22 carbon atoms.

Specific examples of commercially available products of the acetylene glycol-based surfactant include "SURFYNOL 104" (2,4,7,9-tetramethyl-5-decyne-4,7-diol), "SURFYNOL 104E" (a 50% ethylene glycol-diluted solution of "SURFYNOL 104"), "SURFYNOL 104PG-50" (a 50% propylene glycol-diluted solution of "SURFYNOL 104") and "SURFYNOL 420" (a 1.3 mol (on the average) EO adduct of "SURFYNOL 104") all available from Air Products & Chemicals, Inc., "ACETYLENOL E13T" (average molar number of addition of EO: 1.3) available from Kawaken Fine Chemicals Co., Ltd., and the like.

The surfactant may also contain the other surfactant(s) in addition to the aforementioned surfactants. As the other surfactant(s), preferred is a nonionic surfactant, and more preferred is an alcohol-based surfactant.

Specific examples of commercially available products of the alcohol-based surfactant include "EMULGEN" series products available from Kao Corporation.

The content of the surfactants in the ink in terms of a total content of the surfactants is preferably not less than 0.1% by mass, more preferably not less than 0.2% by mass and even more preferably not less than 0.4% by mass, and is also preferably not more than 10% by mass, more preferably not more than 7% by mass and even more preferably not more than 5% by mass, from the viewpoint of improving wettability of the ink to the printing substrate.

(Thickening Agent, Etc.)

The aqueous ink may also contain various additives as optional components, such as a thickening agent, a pH modifier, a defoaming agent, an antiseptic agent, a rust preventive, etc.

Examples of the thickening agent include a cellulose-based thickening agent, a polyacrylic acid-based thickening agent, a polyether polyol-based thickening agent, a polyether urethane-modified product-based thickening agent, and the like.

Specific examples of commercially available products of the polyacrylic acid-based thickening agent include "PRIMAL ASE" series products available from Rohm & Haas Co., and the like. Specific examples of commercially available products of the polyether polyol-based thickening agent include "RHEOLATE" series product available from RHEOX, Inc., and the like. Specific examples of commercially available products of the polyether urethane-modified product-based thickening agent include "ADEKANOL UH" series products available from ADEKA Corporation, "DK THICKENER SCT" series products available from DKS Co., Ltd., and the like.

The amount of the thickening agent compounded in the aqueous ink may be appropriately controlled according to a desired viscosity of the resulting aqueous ink, and is usually controlled to not less than 0.1% by mass and not more than 5% by mass.

(Water)

The content of water in the aqueous ink is preferably not less than 45% by mass, more preferably not less than 50% by mass and even more preferably not less than 55% by mass. From the viewpoint of improving transferring properties of the ink and suppressing fogging on the plate surface, the content of water in the aqueous ink is also preferably not more than 75% by mass, more preferably not more than 70% by mass and even more preferably not more than 65% by mass.

<Properties of Aqueous Ink>

The average particle size of the pigment particles, in particular, the pigment particles A formed by dispersing the pigment with the polymer, in the ink is not less than 120 nm, preferably not less than 130 nm, more preferably not less than 140 nm and even more preferably not less than 150 nm, and is also not more than 350 nm, preferably not more than 340 nm, more preferably not more than 320 nm and even more preferably not more than 300 nm, from the viewpoint of improving transferring properties of the ink and suppressing fogging on the plate surface.

In the suitable embodiment as the fourth embodiment of the present invention, the average particle size of the pigment particles, in particular, the pigment particles A formed by dispersing the pigment with the polymer, in the ink is preferably not less than 40 nm, more preferably not less than 60 nm and even more preferably not less than 80 nm, and is also preferably not more than 250 nm, more preferably not more than 220 nm and even more preferably not more than 200 nm, from the viewpoint of improving transferring properties of the ink and suppressing fogging on the plate surface.

The average particle size of the pigment-free polymer particles B in the ink is preferably not less than 20 nm, more preferably not less than 40 nm and even more preferably not less than 60 nm, and is also preferably not more than 300 nm, more preferably not more than 200 nm and even more preferably not more than 150 nm, from the viewpoint of improving transferring properties of the ink and suppressing fogging on the plate surface.

The average particle sizes of the pigment particles A and the polymer particles B may be measured by the method described in Examples below.

The frequency of particles having a particle size of not more than 130 nm in the particle size distribution of particles contained in the aqueous ink used in the present invention is preferably not more than 40% by volume, more preferably not more than 35% by volume, even more preferably not more than 30% by volume, further even more preferably not more than 25% by volume and still further even more preferably not more than 20% by volume. Incidentally, the aforementioned frequency of the particles means such a frequency as determined when collectively measuring the pigment particles A and the polymer particles B in the ink for their particle frequency.

The polydispersity index in the particle size distribution of the particles contained in the aqueous ink is preferably not less than 0.13, more preferably not less than 0.15 and even more preferably not less than 0.18, and is also preferably not more than 0.3, more preferably not more than 0.28 and even more preferably not more than 0.25.

The term "polydispersity index (PDI)" as used herein means an index for evaluating the width (breadth) of particle size distribution of particles, and may be measured by a dynamic light scattering method and determined by analysis using a cumulant method described in "Polymer Structure (2): Scattering Experiments and Morphological Observation: Chapter 1, Light Scattering" published by Kyoritsu Publishing Co., Ltd., and edited by The Society of Polymer Science, Japan, or "J. Chem. Phys.", 70(B), 15 Apl., 3965 (1979). Incidentally, the aforementioned polydispersity index means such a polydispersity index as obtained when collectively measuring the pigment particles A and the polymer particles B in the ink for their polydispersity index.

The average particle sizes, particle frequencies and polydispersity indices of the pigment particles A and the polymer particles B may be measured by the respective methods described in Examples below.

The static surface tension of the aqueous ink as measured at 20° C. is preferably not less than 20 mN/m, more preferably not less than 22 mN/m, even more preferably not less than 23 mN/m, further even more preferably not less than 24 mN/m and still further even more preferably not less than 25 mN/m, and is also preferably not more than 40 mN/m, more preferably not more than 38 mN/m, even more preferably not more than 34 mN/m, further even more preferably not more than 30 mN/m, still further even more preferably not more than 29 mN/m and furthermore preferably not more than 28 mN/m, from the viewpoint of improving transferring properties of the ink and suppressing fogging on the plate surface.

Meanwhile, the static surface tension of the ink may be measured by the method described in Examples below.

The viscosity of the ink as measured at 20° C. by a Zahn cup method is preferably not less than 10 seconds, more preferably not less than 12 seconds and even more preferably not less than 14 seconds, and is also preferably not more than 25 seconds, more preferably not more than 23 seconds and even more preferably not more than 21 seconds, from the viewpoint of improving transferring properties of the ink and suppressing fogging on the plate surface.

The pH value of the ink as measured at 20° C. is preferably not less than 5.5, more preferably not less than 6.0 and even more preferably not less than 6.5 from the viewpoint of improving dispersion stability of the resulting ink, and is also preferably not more than 11.0, more preferably not more than 10.0 and even more preferably not more than 9.5 from the viewpoint of improving the resistance of members to the ink and suppressing skin irritation.

EXAMPLES

In the following Production Examples, Preparation Examples, Examples and Comparative Examples, the "part(s)" and "%" indicate "part(s) by mass" and "% by mass", respectively, unless otherwise specified. Meanwhile, the respective properties were measured by the following methods.

(1) Measurement of Weight-Average Molecular Weight of Polymer

The weight-average molecular weight of the polymer was measured by gel permeation chromatography [GPA apparatus: "HLA-8120GPA" available from Tosoh Corporation; columns: "TSK-GEL, α-M"×2 available from Tosoh Corporation; flow rate: 1 mL/min)] using a solution prepared by dissolving phosphoric acid and lithium bromide in N,N-dimethyl formamide such that concentrations of phosphoric acid and lithium bromide in the resulting solution were 60 mmol/L and 50 mmol/L, respectively, as an eluent. Meanwhile, in the aforementioned measurement, monodisperse polystyrenes having known molecular weights were used as a reference standard substance.

(2) Measurement of Acid Value of Polymer

In an automatic potentiometric titrator (power burette; "Model No.: APB-610") available from Kyoto Electronics Manufacturing Co., Ltd., a resin was dissolved in a titrant solution prepared by mixing toluene and acetone (2+1), and the resulting solution was subjected to titration with a 0.1N potassium hydroxide/ethanol solution by a potentiometric titration method until reaching an end point of the titration observed as an inflection point of the titration curve. The acid value of the polymer was calculated from an amount (titer) of the potassium hydroxide solution used in the titration until reaching the end point.

(3) Measurement of Solid Content

Sodium sulfate dried to constant weight in a desiccator was weighed in an amount of 10.0 g and charged into a 30 mL polypropylene container (4: 40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids in the sample. The solid content of the sample was calculated by dividing the mass of the solids by the mass of the sample initially added.

(4) Measurement of Average Particle Sizes, Polydispersity Indices and Particle Frequencies of Pigment Particles A and Pigment-Free Polymer Particles B The cumulant average particle sizes of the pigment particles A and the pigment-free polymer particles B were respectively measured using a laser particle analyzing system "Model No.: ELS-8000" (cumulant analysis) available from Otsuka Electrics Co., Ltd. The cumulant average particle sizes thus measured were respectively defined as an average particle size of the pigment particles A and an average particle size of the pigment-free polymer particles B. In addition, the polydispersity indices of the respective particles were determined. The particle frequency of the particles having a particle size of not more than 130 nm was determined from the obtained particle size distributions thereof.

As the sample to be measured, there was used a dispersion liquid prepared by diluting it with water such that a concentration of the particles in the dispersion liquid was adjusted to $5 \times 10^{-3}$%. The measurement was conducted under the conditions including a temperature of 25° C., an angle between incident light and detector of 90° and a cumulative number of 100 times, and a refractive index of water (1.333) was input to the analyzing system as a refractive index of the dispersing medium.

(5) Measurement of Static Surface Tension of Aqueous Ink

A platinum plate was dipped in 5 g of the aqueous ink filled in a cylindrical polyethylene container (3.6 cm in diameter×1.2 cm in depth), and the static surface tension of the aqueous ink was measured at 20° C. using a surface tension meter "CBVP-Z" (tradename) available from Kyowa Interface Science Co., Ltd.

(6) Measurement of Surface Roughness of Plate Surface of Gravure Roll

Using a surface roughness meter "SURFCOM 1400D" available from TOKYO SEIMITSU Co., Ltd., an arithmetic mean roughness (Ra) and a maximum height (Rz) of a plate surface of a gravure roll were measured under the conditions according to JIS' 01 (including a measurement length of 1.25 mm, a cutoff wavelength of 0.25 mm and a measurement velocity of 0.3 mm/s).

Production Example A1 (Production of Pigment Water Dispersion A)

First Embodiment (1) Two hundred thirty six parts of ion-exchanged water were weighed and placed in a 2 L-capacity flask, and then 60 parts of an acrylic polymer "JONCRYL 690" (tradename; weight-average molecular weight: 16500; acid value: 240 mgKOH/g; Tg: 105° C.) available from BASF and 36.5 parts of a 5N sodium hydroxide solution (sodium hydroxide neutralization degree: 60 mol %) were added to the flask. The contents of the flask were stirred for 2 hours using an anchor blade at 200 rpm, thereby obtaining 332.5 parts of an acrylic polymer aqueous solution (solid content: 19.9%).

A 2 L-capacity vessel equipped with a disper blade was charged with 331.7 parts of the aforementioned aqueous solution and 448.3 parts of ion-exchanged water, and the contents of the vessel were stirred using a disper "ULTRA DISPER" (tradename) available from Asada Iron Works Co., Ltd., at 1400 rpm for 15 minutes while cooling in a water bath at 0° C.

(2) Next, 220 parts of a carbon black "#40" (tradename; primary particle size: 24 nm) available from Mitsubishi Chemical Corporation were added to the vessel, and the contents of the vessel were stirred at 6400 rpm for 1 hour. The resulting dispersion liquid was charged into a wet disperser "Ultra Apex Mill UAM05" (tradename) available from HIROSHIMA METAL & MACHINERY Co., Ltd., packed with 0.3 mmφ zirconia beads "XTZ Ball" (tradename) available from Nikkato Corporation at a packing rate of 80%, and subjected to dispersion treatment by passing the dispersion liquid through the disperser 5 times at a peripheral speed of 8 m/s and a flow rate of 200 g/min while cooling with chilled water at 5° C., followed by subjecting the resulting dispersion to filtration treatment through a 200-mesh wire mesh screen.

(3) Added to 500 parts of the above-obtained filtrate (pigment: 110 parts; polymer: 33 parts) were 7.3 parts of "DENACOL EX-321L" (trimethylolpropane polyglycidyl ether; epoxy equivalent: 129) available from Nagase ChemteX Corporation (corresponding to 40 mol % on the basis of a carboxylic acid moiety acting as a crosslinking reaction site contained in acrylic acid in the polymer) and 1 part of "Ploxel LV(S)" (mildew-proof agent; active ingredient content: 20%) available from LONZA Japan K.K., and 17.9 parts of ion-exchanged water were further added thereto such that a solid content of the resulting dispersion was 28.6%. The obtained dispersion was stirred at 70° C. for 3 hours, and then subjected to filtration treatment through a 200-mesh wire mesh screen, thereby obtaining 526.2 parts of a water dispersion A containing 28.6% of pigment-containing polymer particles (pigment water dispersion A; average particle size: 190 nm).

Production Example A2 (Production of Pigment Water Dispersion B)

The same procedure as in Production Example A1 was repeated except that the carbon black used in Production Example A1 was replaced with "MA600" (tradename; primary particle size: 20 nm) available from Mitsubishi Chemical Corporation, thereby obtaining a pigment water dispersion B (average particle size: 160 nm).

Production Example A3 (Production of Pigment Water Dispersion C)

The same procedure as in Production Example A1 was repeated except that the carbon black used in Production Example A1 was replaced with "MONARCH 460" (tradename; primary particle size: 28 nm) available from Cabot Corporation, thereby obtaining a pigment water dispersion C (average particle size: 290 nm).

Production Example A4 (Production of Pigment Water Dispersion D)

The same procedure as in Production Example A1 was repeated except that the carbon black used in Production Example A1 was replaced with "MONARCH 880" (tradename; primary particle size: 16 nm) available from Cabot Corporation, thereby obtaining a pigment water dispersion D (average particle size: 100 nm).

Production Example A5 (Production of Pigment Water Dispersion E)

The same procedure as in Production Example A1 was repeated except that the carbon black used in Production Example A1 was replaced with "REAGAL 250R" (tradename; primary particle size: 34 nm) available from. Cabot Corporation, thereby obtaining a pigment water dispersion E (average particle size: 380 nm).

Production Example A6 (Production of Dispersion Liquid of Pigment-Free Water-Insoluble Polymer Particles>

A reaction vessel equipped with a dropping funnel was charged with 0.5 part of methacrylic acid, 14.5 parts of methyl methacrylate available from FUJIFILM Wako Pure Chemical. Corporation, 5.0 parts of 2-ethylhexyl acrylate available from FUJIFILM Wako Pure Chemical Corporation, 11.1 parts of "LATEMUL E-118B" (sodium polyoxyethylenealkylethersulfate) as a surfactant available from Kao Corporation, 0.2 part of potassium persulfate as a polymerization initiator available from FUJIFILM Wako Pure Chemical Corporation and 282.8 parts of ion-exchanged water, followed by mixing the contents of the reaction vessel with each other at 150 rpm. Then, an inside atmosphere of the reaction vessel was replaced with nitrogen gas, thereby obtaining an initially charged monomer solution.

Then, 9.5 parts of the methacrylic acid, 275.5 parts of the methyl methacrylate, 95.0 parts of the 2-ethylhexyl acrylate, 35.1 parts of "LATEMUL E-118B", 0.6 part of the potassium persulfate and 183.0 parts of ion-exchanged water were mixed with each other at 150 rpm to prepare a dropping monomer solution. The resulting dropping monomer solution was charged into the dropping funnel, and an inside atmosphere of the dropping funnel was replaced with nitrogen gas.

In a nitrogen atmosphere, the initially charged monomer solution in the reaction vessel was heated from room temperature to 80° C. over 30 minutes while stirring at 150 rpm, and while maintaining the initially charged monomer solution at 80° C., the monomers in the dropping funnel were gradually added dropwise to the reaction vessel over 3 hours. After completion of the dropwise addition, while maintaining the inside temperature of the reaction vessel, the resulting mixed solution in the reaction vessel was stirred for 1 hour, and mixed with 204.7 parts of ion-exchanged water. Then, the resulting dispersion was filtered through a stainless steel wire mesh screen (200 mesh), thereby obtaining a dispersion liquid of water-insoluble polymer particles (solid content: 40%; average particle size: 100 nm; acid value: 16 mgKOH/g; Tg: 48° C.).

Preparation of Inks for Gravure Printing

Preparation Example A1 (Preparation of Ink A1)

A production vessel was charged with 54.5 parts of the pigment water dispersion A obtained in Production Example A1 (corresponding to a pigment concentration of 11.5% in the ink), and further with 0.77 part of a neutralizing agent (a 5N sodium hydroxide solution) available from FUJIFILM Wako Pure Chemical Corporation and 19.5 parts of the dispersion liquid of the pigment-free water-insoluble polymer particles obtained in Production Example A6 (corresponding to a polymer concentration of 8.0% in the ink; solid content: 41%) so as to provide an ink having such a composition as shown in Table A1, followed by stirring the contents of the production vessel at 150 rpm.

Moreover, 7 parts of diethylene glycol monoisobutyl ether, 1.0 part of a silicone-based surfactant "KF-6011" (tradename; PEG-11 methyl ether dimethicone) available from Shin-Etsu Chemical Co., Ltd., 1.0 part of an acetylene glycol-based surfactant "SURFYNOL 104PG50" (tradename; 2,4,7,9-tetramethyl-5-decyne-4,7-diol; active ingredient content: 50%; propylene glycol solution) available from Nissin Chemical Co., Ltd., 0.8 part of a thickening agent "ADEKANOL UH-420" (tradename; aqueous solution having an active ingredient content of 30%) available from ADEKA Corporation, and 15.4 parts of ion-exchanged water were added to the production vessel, followed by stirring the contents of the production vessel at room temperature for 30 minutes. Then, the resulting dispersion was subjected to filtration treatment through a stainless steel wire mesh screen (200 mesh), thereby obtaining an ink A1.

The respective symbols shown in Table A1 represent the following meanings.

iBDG: Diethylene glycol monoisobutyl ether (boiling point (b.p.) 220° C.; SP value: 8.7) available from FUJIFILM Wako Pure Chemical Corporation MFG: Propylene glycol monomethyl ether (b.p. 121° C.; SP value: 10.4) available from FUJIFILM Wako Pure Chemical Corporation MTG: Triethylene glycol monomethyl ether (b.p. 249° C.; SP value: 10.5) available from FUJIFILM Wako Pure Chemical Corporation IPA: Isopropyl alcohol (b.p. 88° C.; SP value: 11.5) available from FUJIFILM Wako Pure Chemical Corporation BTG: Triethylene glycol monobutyl ether (b.p. 271° C.; SP value: 9.6) available from FUJIFILM Wako Pure Chemical Corporation Preparation Examples A2 to A13 (Preparation of Inks A2 to A13)

The same procedure as in Preparation Example A1 was repeated except that the formulation of the ink prepared in Preparation Example A1 was changed to those shown in Table A1, thereby obtaining inks A2 to A13.

TABLE A1

| Ink No. | A1 | A2 | A3 | A4 | A5 | A6 | A7 | A8 | A9 | A10 | A11 | A12 | A13 |
|---|---|---|---|---|---|---|---|---|---|---|---|---|---|
| Pigment water dispersion A (190 nm) | 54.5 | | | 54.5 | 54.5 | 54.5 | 54.5 | | | 54.5 | 54.5 | 54.5 | 54.5 |
| Pigment water dispersion B (160 nm) | | 54.5 | | | | | | | | | | | |
| Pigment water dispersion C (290 nm) | | | 54.5 | | | | | | | | | | |
| Pigment water dispersion D (100 nm) | | | | | | | | 54.5 | | | | | |
| Pigment water dispersion E (380 nm) | | | | | | | | | 54.5 | | | | |
| Dispersion liquid of polymer particles | 19.5 | 19.5 | 19.5 | 19.5 | 19.5 | 19.5 | 19.5 | 19.5 | 19.5 | 19.5 | 19.5 | 19.5 | 19.5 |
| iBDG (b.p. 220° C.) | 7.0 | 7.0 | 7.0 | | | 10.0 | 0.5 | 7.0 | 7.0 | | | | 15.0 |
| MFG (b.p. 121° C.) | | | | 7.0 | | | | | | | | | |
| MTG (b.p. 249° C.) | | | | | 7.0 | | | | | | | | |
| IPA (b.p. 88° C.) | | | | | | | | | | 7.0 | | | |
| BTG (b.p. 271° C.) | | | | | | | | | | | 7.0 | | |
| Silicone-based surfactant | 1.0 | 1.0 | 1.0 | 1.0 | 1.0 | 1.0 | 2.0 | 1.0 | 1.0 | 1.0 | 1.0 | 4.0 | 1.0 |
| Acetylene glycol-based surfactant | 1.0 | 1.0 | 1.0 | 1.0 | 1.0 | 1.0 | 3.0 | 1.0 | 1.0 | 1.0 | 1.0 | 4.0 | 1.0 |
| Thickening agent | 0.8 | 0.8 | 0.8 | 0.8 | 0.8 | 0.8 | 0.8 | 0.8 | 0.8 | 0.8 | 0.8 | 0.8 | 0.8 |
| 5N NaOH | 0.77 | 0.77 | 0.77 | 0.77 | 0.77 | 0.77 | 0.77 | 0.77 | 0.77 | 0.77 | 0.77 | 0.77 | 0.77 |
| Ion-exchanged water | 15.4 | 15.4 | 15.4 | 15.4 | 15.4 | 12.4 | 18.9 | 15.4 | 15.4 | 15.4 | 15.4 | 16.4 | 7.4 |
| Total | 100 | 100 | 100 | 100 | 100 | 100 | 100 | 100 | 100 | 100 | 100 | 100 | 100 |

Example A1

Using the ink A1 obtained in Preparation Example A1, printing was conducted on a corona discharge-treated surface of a biaxially oriented polypropylene film "FOR-AQ #20" (tradename; laminate grade; thickness: 20 μm) available from Futamura Chemical Co, Ltd. In the printing, there was used a gravure printing press (gravure three-color printability tester) available from OKAZAKI MACHINE INDUSTRY CO., LTD., equipped with a gravure roll A (laser plate making type; roll diameter: 200 mm; roll length: 1100 mm; number of gravure screen lines: 250; cell depth: 8 μm; paper polishing treatment: #1000) available from Nabe Process Corporation and a doctor blade (ceramic composite doctor; plated layer: nickel/ceramic composite type; Vickers hardness: 850 Hv; plated layer thickness: 10 μm; blade edge thickness: 90 μm; parallel blade). Also, the printing was conducted under the conditions including a printing speed of 75 m/min, a drying temperature of 70° C., a furnisher roll (material: NBR; rubber hardness:70°), a contact pressure between the furnisher roll and the gravure roll of 0.3 MPa, a rotating speed of the furnisher roll of 15% on the basis of 100% of a rotating speed of the gravure roll, a contact pressure between the doctor blade and the gravure roll of 0.15 MPa, a nip roll (material: NBR; rubber hardness: 70°), and a contact pressure of the nip roll against a printing substrate of 0.15 MPa (refer to FIG. 1).

Examples A2 to A4

The same procedure as in Example A1 was repeated except that the polishing paper used in the paper polishing treatment in Example A1 was replaced with #500, #800 and #1500, respectively.

Example A5

The same procedure as in Example A1 was repeated except that the gravure roll A used in Example A1 was replaced with a gravure roll B (electro-engraving plate making type; number of gravure screen lines: 175; cell depth: 10 μm; paper polishing treatment: #1000) available from Nabe Process Corporation.

Examples A6 to A11

The same procedure as in Example A1 was repeated except that the ink A1 used in in Example A1 was replaced with the inks A2 to A7. respectively.

Comparative Example A1

The same procedure as in Example A1 was repeated except that the polishing paper used in the paper polishing treatment in Example A1 was replaced with #300.

Comparative Examples A2 and A3

The same procedure as in Example A1 was repeated except that the ink A1 used in Example A1 was replaced with the inks A8 and A9, respectively, and the conditions used in Example A1 were respectively changed to those shown in Table A3.

Comparative Examples A4 to A7

The same procedure as in Example A1 was repeated except that the ink A1 used in Example A1 was replaced with the inks A10 to A13, respectively.

<Evaluation of Inks>

The resulting inks were evaluated for ink transfer rate and fog density on the plate surface by the following evaluation methods. The results are shown in Tables A2 and A3.

<Method for Evaluating Transfer Rate of Ink>

One hundred percent (100%) halftone dot printing was conducted to prepare a solid image printed material which was cut into a size of 100 mm×100 mm. The initial mass of the printed material was measured, and the printed material was wiped with acetone impregnated in "BEMCOT" to remove the ink therefrom. Thereafter, the printed material was dried by a hot air at 40° C. for 12 hours to measure a mass thereof. The difference between the initial mass of the printed material and the mass thereof after removing the ink therefrom and being dried by a hot air was defined as an amount of the ink transferred. The transfer rate (%) of the ink was calculated from the volume of cells (recessed portions) on a plate surface of the gravure roll and the amount of the ink transferred according to the following formula, and was evaluated according to the following ratings.

Transfer Rate(%)of Ink=[(amount of ink transferred)/(volume of gravure cells)]×100

(Evaluation Ratings)

⊚: Transfer rate of the ink was from 61 to 70%;
○: Transfer rate of the ink was from 56 to 60%;
Δ: Transfer rate of the ink was from 51 to 55%; and
x: Transfer rate of the ink was from 40 to 50%.

When the evaluation rating was ⊚, ○ or Δ, the ink could be used in the practical applications without problems.

<Method for Evaluating Fog Density on Plate Surface>

Ten cut sheets of a non-printing area portion that was free of printing operation were stacked and overlapped on each other, and a fog density on the plate surface was measured using a spectrophotometer "SpectroEye" (tradename) available from GretagMacbeth AG under a density measuring mode (DIN, Abs). The fog density on the plate surface was evaluated according to the following evaluation ratings.

(Evaluation Ratings)

⊚: Fog density on the plate surface was from 0.30 to 0.35;
○: Fog density on the plate surface was from 0.36 to 0.40;
Δ: Fog density on the plate surface was from 0.41 to 0.45; and
x: Fog density on the plate surface was from 0.46 to 0.55.

When the evaluation rating is ⊚, ○ or Δ, the ink can be used in the practical applications without problems.

TABLE A2

| | Examples | | | | | | | | | | |
|---|---|---|---|---|---|---|---|---|---|---|---|
| | A1 | A2 | A3 | A4 | A5 | A6 | A7 | A8 | A9 | A10 | A11 |
| Ink No. | A1 | A1 | A1 | A1 | A1 | A2 | A3 | A4 | A5 | A6 | A7 |
| Average particle size of particles in ink (nm) | 190 | 190 | 190 | 190 | 190 | 160 | 290 | 190 | 190 | 190 | 190 |
| Particle frequency of particles having a particle size of not more than 130 nm (volume %) | 17 | 17 | 17 | 17 | 17 | 37 | 3 | 17 | 17 | 17 | 17 |
| Polydispersity index of ink | 0.20 | 0.20 | 0.20 | 0.20 | 0.20 | 0.15 | 0.28 | 0.2 | 0.2 | 0.2 | 0.2 |
| Polishing paper # count | 1000 | 500 | 800 | 1500 | 1000 | 1000 | 1000 | 1000 | 1000 | 1000 | 1000 |
| Ra of plate surface of gravure roll (nm) | 86 | 134 | 107 | 20 | 42 | 86 | 86 | 86 | 86 | 86 | 86 |
| Rz of plate surface of gravure roll (nm) | 148 | 240 | 190 | 100 | 122 | 148 | 148 | 148 | 148 | 148 | 148 |
| Transfer rate of ink | ⊚ | ○ | ○ | ○ | ⊚ | ○ | Δ | Δ | ○ | ○ | ○ |
| | 67 | 56 | 58 | 60 | 70 | 57 | 53 | 55 | 59 | 60 | 56 |
| Fog density on plate surface | ⊚ | ○ | ⊚ | ⊚ | ○ | Δ | ○ | ○ | Δ | ○ | ○ |
| | 0.33 | 0.38 | 0.35 | 0.30 | 0.40 | 0.43 | 0.36 | 0.40 | 0.44 | 0.40 | 0.36 |

TABLE A3

| | Comparative Examples | | | | | | |
|---|---|---|---|---|---|---|---|
| | A1 | A2 | A3 | A4 | A5 | A6 | A7 |
| Ink No. | A1 | A8 | A9 | A10 | A11 | A12 | A13 |
| Average particle size of particles in ink (nm) | 190 | 100 | 380 | 190 | 190 | 190 | 190 |
| Particle frequency of particles having a particle size of not more than 130 nm (volume %) | 17 | 66 | 0 | 17 | 17 | 17 | 17 |
| Polydispersity index of ink | 0.15 | 0.13 | 0.31 | 0.15 | 0.15 | 0.15 | 0.15 |
| Polishing paper # count | 300 | 1000 | 1000 | 1000 | 1000 | 1000 | 1000 |
| Ra of plate surface of gravure roll (nm) | 186 | 86 | 86 | 86 | 86 | 86 | 86 |
| Rz of plate surface of gravure roll (nm) | 421 | 148 | 148 | 148 | 148 | 148 | 148 |
| Transfer rate of ink | X | Δ | X | Δ | Δ | Δ | Δ |
| | 45 | 51 | 48 | 52 | 55 | 54 | 51 |
| Fog density on plate surface | X | X | Δ | Δ | Δ | Δ | Δ |
| | 0.50 | 0.55 | 0.41 | 0.41 | 0.45 | 0.44 | 0.43 |

From Tables A2 and A3, it was confirmed that in the printing method used in Examples A1 to A11 (first embodiment), the transfer rate of the ink was high so as to allow stable continuous printing, and at the same time, the fogging on the plate surface was suppressed to provide a high-quality printed material, as compared to those in the printing method used in Comparative Examples A1 to A7.

Preparation Examples B1 to B5 (Preparation of Inks B1 to B5)

Second Embodiment

The same procedure as in Preparation Example A1 was repeated except that the formulation of the ink prepared in Preparation Example A1 was changed to those shown in Table B1, thereby obtaining inks B1 to B5.

The meanings of the symbols for the solvents shown in Table B1 are the same as those shown in the aforementioned Table A1.

TABLE B1

| Ink No. | B1 | B2 | B3 | B4 | B5 |
|---|---|---|---|---|---|
| Pigment water dispersion | 54.5 | 54.5 | 54.5 | 54.5 | 54.5 |
| Dispersion liquid of polymer particles | 19.5 | 19.5 | 19.5 | 19.5 | 19.5 |
| iBDG (b.p. 220° C.) | 7.0 | 10.0 | 0.5 | | |
| MFG (b.p. 121° C.) | | | | 7.0 | |
| MTG (b.p. 249° C.) | | | | | 7.0 |
| Silicone-based surfactant | 1.0 | 0.1 | 2.0 | 1.0 | 1.0 |
| Acetylene glycol-based surfactant | 1.0 | 0.2 | 3.0 | 1.0 | 1.0 |
| Thickening agent | 0.8 | 0.8 | 0.8 | 0.8 | 0.8 |
| 5N NaOH | 0.77 | 0.77 | 0.77 | 0.77 | 0.77 |
| Ion-exchanged water | 15.4 | 14.1 | 18.9 | 15.4 | 15.4 |
| Total | 100 | 100 | 100 | 100 | 100 |
| Static surface tension (mN/m) | 26 | 24 | 23 | 27 | 29 |

Examples B1 to B11

The same procedure as in Example A1 was repeated except that the conditions used in Example A1 were changed to those shown in Table B2.

<Evaluation of Inks>

The resulting inks were evaluated for ink transfer rate and fog density on the plate surface by the same evaluation methods as described above. The results are shown in Table B2.

TABLE B2

| | Examples | | | | | | | | | | |
|---|---|---|---|---|---|---|---|---|---|---|---|
| | B1 | B2 | B3 | B4 | B5 | B6 | B7 | B8 | B9 | B10 | B11 |
| Ink No. | B1 | B1 | B1 | B1 | B1 | B1 | B1 | B2 | B3 | B4 | B5 |
| Conditions of furnisher roll | | | | | | | | | | | |
| Material of rubber roll | NBR | EPDM | Butyl rubber | NBR | NBR | NBR | NBR | NBR | NBR | NBR | NBR |
| Rubber hardness (°) | 70 | 80 | 65 | 70 | 70 | 70 | 70 | 70 | 70 | 70 | 70 |
| Roll contact pressure (MPa)* | 0.25 | 0.25 | 0.25 | 0.10 | 0.40 | 0.25 | 0.25 | 0.25 | 0.25 | 0.25 | 0.25 |
| Rotating speed (%) | 15 | 15 | 15 | 15 | 5 | 25 | 15 | 15 | 15 | 15 | 15 |
| Transfer rate of ink | ◎ 67 | ○ 59 | ○ 56 | Δ 52 | ○ 58 | Δ 52 | ○ 60 | ○ 57 | ○ 53 | ○ 55 | ○ 59 |
| Fog density on plate surface | ◎ 0.33 | ○ 0.38 | ○ 0.36 | ○ 0.37 | Δ 0.44 | ○ 0.36 | Δ 0.45 | ○ 0.43 | ○ 0.36 | ○ 0.40 | ○ 0.44 |

Note:
*The roll contact pressure means a contact pressure under which the furnisher roll was contacted with the gravure roll.

From Table B2, it was confirmed that in the printing method used in Examples B1 to B11 (second embodiment), the transfer rate of the ink was high so as to allow stable continuous printing, and at the same time, fogging on the plate surface was suppressed to provide a high-quality printed material.

Preparation Examples C1 to C7 (Preparation of Inks C1 to C7)

Third Embodiment

The same procedure as in Preparation Example A1 was repeated except that the formulation of the ink prepared in Preparation Example A1 was changed to those shown in Table C1, thereby obtaining inks C1 to C7.

The meanings of the symbols for the solvents shown in Table C1 are the same as those shown in the aforementioned Table A1.

TABLE C1

| Ink No. | C1 | C2 | C3 | C4 | C5 | C6 | C7 |
|---|---|---|---|---|---|---|---|
| Pigment water dispersion A (190 nm) | 54.5 | | | 54.5 | 54.5 | 54.5 | 54.5 |
| Pigment water dispersion B (160 nm) | | 54.5 | | | | | |
| Pigment water dispersion C (290 nm) | | | 54.5 | | | | |
| Pigment water dispersion D (100 nm) | | | | | | | |
| Pigment water dispersion E (380 nm) | | | | | | | |
| Dispersion liquid of polymer particles | 19.5 | 19.5 | 19.5 | 19.5 | 19.5 | 19.5 | 19.5 |
| iBDG (b.p. 220° C.) | 7.0 | 7.0 | 7.0 | | | 10.0 | 0.5 |
| MFG (b.p. 121° C.) | | | | 7.0 | | | |
| MTG (b.p. 249° C.) | | | | | 7.0 | | |
| IPA (b.p. 88° C.) | | | | | | | |
| BTG (b.p. 271° C.) | | | | | | | |
| Silicone-based surfactant | 1.0 | 1.0 | 1.0 | 1.0 | 1.0 | 1.0 | 2.0 |
| Acetylene glycol-based surfactant | 1.0 | 1.0 | 1.0 | 1.0 | 1.0 | 1.0 | 3.0 |
| Thickening agent | 0.8 | 0.8 | 0.8 | 0.8 | 0.8 | 0.8 | 0.8 |
| 5N NaOH | 0.77 | 0.77 | 0.77 | 0.77 | 0.77 | 0.77 | 0.77 |
| Ion-exchanged water | 15.4 | 15.4 | 15.4 | 15.4 | 15.4 | 12.4 | 18.9 |
| Total | 100 | 100 | 100 | 100 | 100 | 100 | 100 |

Examples C1 to C19

The same procedure as in Example A1 was repeated except that the conditions used in Example A1 were changed to those shown in Table C2.

The details of the kinds of doctor blades shown in Table C2 are as follows.

The doctor blades A and E to K are ceramic composite doctor blades available from Eco Blade, Inc., and provided thereon with a plated layer of a nickel/ceramic composite type.

The doctor blade B is a Duallo NE doctor blade available from Nihon SK Co., Ltd., and provided thereon with a nickel-based binary alloy plated layer.

The doctor blade C is a ceramic doctor blades available from Eco Blade, Inc.

The doctor blade D is a F Cera doctor blade available from Nihon SK Co., Ltd., and provided thereon with a plated layer of a nickel/fluororesin composite type.

<Evaluation of Inks>

The resulting inks were evaluated for ink transfer rate and fog density on the plate surface by the same evaluation methods as described above. The results are shown in Table C2.

TABLE C2-1

| | Examples | | | | | | | | | |
|---|---|---|---|---|---|---|---|---|---|---|
| | C1 | C2 | C3 | C4 | C5 | C6 | C7 | C8 | C9 | C10 |
| Ink No. | C1 | C1 | C1 | C1 | C1 | C1 | C1 | C1 | C1 | C1 |
| Average particle size of particles in ink | 190 | 190 | 190 | 190 | 190 | 190 | 190 | 190 | 190 | 190 |
| Conditions of doctor blade | | | | | | | | | | |
| Kind | A | B | C | D | E | F | G | H | I | J |
| Shape of tip of blade edge | *1 | *1 | *1 | *1 | *2 | *3 | *4 | *1 | *1 | *1 |
| Thickness of blade edge (μm) | 90 | 90 | 90 | 90 | 90 | 90 | 90 | 60 | 300 | 90 |
| Vickers hardness (Hv) | 850 | 750 | 900 | 950 | 850 | 850 | 850 | 850 | 850 | 850 |
| Thickness of plated layer (μm) | 10 | 10 | 10 | 10 | 10 | 10 | 10 | 10 | 10 | 5 |
| Contact pressure (MPa) | 0.15 | 0.15 | 0.15 | 0.15 | 0.15 | 0.15 | 0.15 | 0.15 | 0.15 | 0.15 |
| Transfer rate of ink | ⊚ | ⊚ | ○ | ○ | ○ | ○ | ○ | ○ | Δ | ○ |
| | 67 | 69 | 60 | 56 | 58 | 56 | 59 | 59 | 52 | 60 |
| Fog density on plate surface | ⊚ | ○ | ⊚ | ⊚ | ○ | ○ | ○ | Δ | ○ | Δ |
| | 0.33 | 0.36 | 0.31 | 0.30 | 0.38 | 0.36 | 0.40 | 0.41 | 0.37 | 0.45 |

Note
1*: Parallel blade;
2*: Taper blade;
3*: Round blade;
4*: Square blade

TABLE C2-2

| | Examples | | | | | | | | |
|---|---|---|---|---|---|---|---|---|---|
| | C11 | C12 | C13 | C14 | C15 | C16 | C17 | C18 | C19 |
| Ink No. | C1 | C1 | C1 | C2 | C3 | C4 | C5 | C6 | C7 |
| Average particle size of particles in ink | 190 | 190 | 190 | 160 | 290 | 190 | 190 | 190 | 190 |
| Conditions of doctor blade | | | | | | | | | |
| Kind | K | A | A | A | A | A | A | A | A |
| Shape of tip of blade edge | 1* | 1* | 1* | 1* | 1* | 1* | 1* | 1* | 1* |
| Thickness of blade edge (μm) | 90 | 90 | 90 | 90 | 90 | 90 | 90 | 90 | 90 |
| Vickers hardness (Hv) | 850 | 850 | 850 | 850 | 850 | 850 | 850 | 850 | 850 |
| Thickness of plated layer (μm) | 20 | 10 | 10 | 10 | 10 | 10 | 10 | 10 | 10 |
| Contact pressure (MPa) | 0.15 | 0.05 | 0.30 | 0.15 | 0.15 | 0.15 | 0.15 | 0.15 | 0.15 |
| Transfer rate of ink | Δ | ○ | Δ | ⊚ | ○ | ○ | ○ | ○ | ○ |
| | 53 | 60 | 53 | 69 | 57 | 56 | 58 | 59 | 56 |
| Fog density on plate surface | ○ | Δ | ○ | ○ | ⊚ | ○ | ○ | ○ | ○ |
| | 0.40 | 0.45 | 0.40 | 0.40 | 0.31 | 0.37 | 0.40 | 0.38 | 0.36 |

Note
1*: Parallel blade;
2*: Taper blade;
3*: Round blade;
4*: Square blade

From Table C2, it was confirmed that in the printing method used in Examples C1 to C19 (third embodiment), the transfer rate of the ink was high so as to allow stable continuous printing, and at the same time, fogging on the plate surface was suppressed to provide a high-quality printed material.

Production Example D1 (Production of Pigment Water Dispersion D1)

Fourth Embodiment (1) Two hundred thirty six parts of ion-exchanged water were weighed and placed in a 2 L-capacity flask, and then 60 parts of an acrylic polymer "JONCRYL 690" (tradename; weight-average molecular weight: 16500; acid value: 240 mgKOH/g; Tg: 105° C.) available from BASF and 36.5 parts of a 5N sodium hydroxide solution (sodium hydroxide neutralization degree: 60 mol %) were added to the flask. The contents of the flask were stirred for 2 hours using an anchor blade at 200 rpm, thereby obtaining 332.5 parts of an acrylic polymer aqueous solution (solid content: 19.9%).

A 2 L-capacity vessel equipped with a disper blade was charged with 331.7 parts of the aforementioned aqueous solution and 448.3 parts of ion-exchanged water, and the contents of the vessel were stirred using a disper "ULTRA DISPER" (tradename) available from Asada Iron Works Co., Ltd., at 1400 rpm for 15 minutes while cooling in a water bath at 0° C.

(2) Next, 220 parts of a carbon black "MONARCH 880" (tradename; primary particle size: 16 nm) available from Cabot Corporation were added to the vessel, and the contents of the vessel were stirred at 6400 rpm for 1 hour. The resulting dispersion liquid was charged into a wet disperser "Ultra Apex Mill UAM05" (tradename) available from HIROSHIMA METAL & MACHINERY Co., Ltd., packed with 0.3 mmφ zirconia beads "XTZ Ball" (tradename) available from Nikkato Corporation at a packing rate of 80%, and subjected to dispersion treatment by passing the dispersion liquid through the disperser 5 times at a peripheral speed of 8 m/s and a flow rate of 200 g/min while cooling with chilled water at 5° C., followed by subjecting the resulting dispersion to filtration treatment through a 200-mesh wire mesh screen.

(3) Added to 500 parts of the above-obtained filtrate (pigment: 110 parts; polymer: 33 parts) were 7.3 parts of "DENACOL EX-321L" (trimethylolpropane polyglycidyl ether; epoxy equivalent: 129) available from Nagase ChemteX Corporation (corresponding to 40 mol % on the basis of a carboxylic acid moiety acting as a crosslinking reaction site contained in acrylic acid in the polymer) and 1 part of "Ploxel LV(S)" (mildew-proof agent; active ingredient content: 20%) available from LONZA Japan K.K., and 17.9 parts of ion-exchanged water were further added thereto such that a solid content of the resulting dispersion was 28.6%. The obtained dispersion was stirred at 70° C. for 3 hours, and then subjected to filtration treatment through a 200-mesh wire mesh screen, thereby obtaining 526.2 parts of a water dispersion D1 containing 28.6% of pigment-containing polymer particles (pigment water dispersion D1; average particle size: 100 nm).

Production Example D2 (Production of Dispersion Liquid of Pigment-Free Water-Insoluble Polymer Particles>

A reaction vessel equipped with a dropping funnel was charged with 0.5 part of methacrylic acid, 14.5 parts of methyl methacrylate available from Wako Pure Chemical Industries, Ltd., 5.0 parts of 2-ethylhexyl acrylate available from Wako Pure Chemical Industries, Ltd., 11.1 parts of "LATEMUL E-118B" (sodium polyoxyethylenealkylethersulfate) as a surfactant available from Kao Corporation, 0.2 part of potassium persulfate as a polymerization initiator available from Wako Pure Chemical Industries, Ltd., and 282.8 parts of ion-exchanged water, followed by mixing the contents of the reaction vessel with each other at 150 rpm. Then, an inside atmosphere of the reaction vessel was replaced with nitrogen gas, thereby obtaining an initially charged monomer solution.

Then, 9.5 parts of the methacrylic acid, 275.5 parts of the methyl methacrylate, 95.0 parts of 2-ethylhexyl acrylate, 35.1 parts of "LATEMUL E-118B", 0.6 part of the potassium persulfate and 183.0 parts of ion-exchanged water were mixed with each other at 150 rpm to prepare a dropping monomer solution. The resulting dropping monomer solution was charged into the dropping funnel, and an inside atmosphere of the dropping funnel was replaced with nitrogen gas.

In a nitrogen atmosphere, the initially charged monomer solution in the reaction vessel was heated from room temperature to 80° C. over 30 minutes while stirring at 150 rpm, and while maintaining the initially charged monomer solution at 80° C., the monomers in the dropping funnel were gradually added dropwise to the reaction vessel over 3 hours. After completion of the dropwise addition, while maintaining the inside temperature of the reaction vessel, the resulting mixed solution in the reaction vessel was stirred for 1 hour, and mixed with 204.7 parts of ion-exchanged water. Then, the resulting dispersion was filtered through a stainless steel wire mesh screen (200 mesh), thereby obtaining a dispersion liquid of water-insoluble polymer particles (solid content: 40%; average particle size: 100 nm; acid value: 16 mgKOH/g; Tg: 48° C.).

Preparation of Inks for Gravure Printing

Preparation Example D1 (Preparation of Ink D1)

A production vessel was charged with 54.5 parts of the pigment water dispersion D1 obtained in Production Example D1 (corresponding to a pigment concentration of 11.5% in the ink), and further with 0.77 part of a neutralizing agent (a 5N sodium hydroxide solution) available from Wako Pure Chemical Industries, Ltd., and 19.5 parts of the dispersion liquid of the pigment-free water-insoluble polymer particles obtained in Production Example D2 (corresponding to a polymer concentration of 8.0% in the ink; solid content: 41%) so as to provide an ink having such a composition as shown in Table D1, followed by stirring the contents of the production vessel at 150 rpm.

Moreover, 7 parts of diethylene glycol monoisobutyl ether, 1.0 part of a silicone-based surfactant "KF-6011" (tradename; PEG-11 methyl ether dimethicone) available from Shin-Etsu Chemical Co., Ltd., 1.0 part of an acetylene glycol-based surfactant "SURFYNOL 104PG50" (tradename; 2,4,7,9-tetramethyl-5-decyne-4,7-diol; active ingredient content: 50%; propylene glycol solution) available from Nissin Chemical Co., Ltd., 0.8 part of a thickening agent "ADEKANOL UH-420" (tradename; aqueous solution having an active ingredient content of 30%) available from ADEKA Corporation, and 15.4 parts of ion-exchanged water were added to the production vessel, followed by stirring the contents of the production vessel at room temperature for 30 minutes. Then, the resulting dispersion was subjected to filtration treatment through a stainless steel wire mesh screen (200 mesh), thereby obtaining an ink D1 (average boiling point of the dispersing medium: 111.8° C.).

The formulation of the ink D1 is shown in Table D1, and the weighted mean boiling point of the dispersing medium as the calculated value is shown in Table D2.

Incidentally, the meanings of the symbols for the organic solvents shown in Table D1 are the same as those described above.

Preparation Examples D2 and D3 (Preparation of Inks D2 and D3)

The same procedure as in Preparation Example D1 was repeated except that the formulation of the ink prepared in Preparation Example D1 was changed to those shown in Table D1, thereby obtaining inks D2 and D3.

The meanings of the symbols for the solvents shown in Table D1 are the same as those shown in the aforementioned Table A1.

TABLE D1

| Ink No. | D1 | D2 | D3 |
|---|---|---|---|
| Pigment water dispersion D1 | 54.5 | 54.5 | 54.5 |
| Dispersion liquid of polymer particles | 19.5 | 19.5 | 19.5 |
| iBDG (b.p. 220° C.) | 7.0 | | |
| MFG (b.p. 121° C.) | | 5.0 | |
| MTG (b.p. 249° C.) | | | 10.0 |
| IPA (b.p. 88° C.) | | | |
| BTG (b.p. 271° C.) | | | |
| Silicone-based surfactant | 1.0 | 1.0 | 1.0 |
| Acetylene glycol-based surfactant | 1.0 | 1.0 | 1.0 |
| Thickening agent | 0.8 | 0.8 | 0.8 |
| 5N NaOH | 0.77 | 0.77 | 0.77 |
| Ion-exchanged water | 15.4 | 17.4 | 12.4 |
| Total | 100.0 | 100.0 | 100.0 |
| Weighted mean boiling point of dispersing medium (° C.) | 111.8 | 102.0 | 120.5 |

TABLE D2

| | | Ink No. | | |
|---|---|---|---|---|
| | | D1 | D2 | D3 |
| | boiling point | Composition of dispersing medium | | |
| iBDG | 220° C. | 7.0 | | |
| MFG | 121° C. | | 5.0 | |
| MTG | 249° C. | | | 10.0 |
| IPA | 88° C. | | | |
| BTG | 271° C. | | | |
| PG (PG contained in acetylene glycol-based surfactant) | 188° C. | 0.5 | 0.5 | 0.5 |
| Ion-exchanged water | 100° C. | 67.2 | 69.2 | 64.2 |
| Weighted mean boiling point of dispersing medium (° C.) | | 118.8 | 102.0 | 120.5 |

Example D1

Using the ink D1 obtained in Preparation Example D1, printing was conducted on a corona discharge-treated surface of a biaxially oriented polypropylene film "FOR-AQ #20" (tradename; laminate grade; thickness: 20 μm) available from Futamura Chemical Co, Ltd. In the printing, there was used a gravure printing press (gravure three-color printability tester) available from OKAZAKI MACHINE INDUSTRY CO., LTD., equipped with a gravure roll A (laser plate making type; roll diameter: 200 mm; roll length: 1100 mm; number of gravure screen lines: 250; cell depth: 8 μm; paper polishing treatment: #1000) available from Nabe Process Corporation and a doctor blade (ceramic composite doctor; plated layer: nickel/ceramic composite type; Vickers hardness: 850 Hv; plated layer thickness: 10 μm; blade edge thickness: 90 μm; parallel blade) available from Eco Blade, Inc. Also, the printing was conducted under the conditions including a printing speed of 100 m/min, a drying temperature of 70° C., a furnisher roll (material: NBR), a furnisher roll pressure of 0.3 MPa, a rotating speed of the furnisher roll of 15% on the basis of 100% of a rotating speed of the gravure roll, a contact pressure between the doctor blade and the gravure roll of 0.15 MPa, a nip roll (material: NBR), and a contact pressure of the nip roll against the printing substrate of 0.15 MPa.

In addition, twelve air nozzles each having a pore diameter of 7 mm were disposed at the intervals of 100 mm at the position spaced apart by 50 mm from the plate surface of the gravure roll, and then printing was conducted while blowing a hot air having a temperature of 25° C. and a relative humidity of 20% from the air nozzles against the plate surface of the gravure roll at an air quantity of 1.83 L/min (air velocity: 0.8 m/s) (refer to FIG. 3). The printing was conducted at a printing speed of 100 m/min that was higher than 75 m/min used in Example A1.

Examples D2 to D12

The same procedure as in Example D1 was repeated except that the conditions used in Example D1 were changed to those shown in Table D3.

Incidentally, in Example D10, suction nozzles each having a pore diameter of 7 mm were disposed along the air nozzles on an upper surface side of the air nozzles at the intervals of 100 mm at the position spaced apart by 50 mm from the plate surface of the gravure roll, and then printing was conducted while sucking the hot air blown on the plate surface at an air suction quantity of 1.83 L/min (air suction velocity: 0.8 m/s) (refer to FIG. 3).

<Evaluation of Inks>

The resulting inks were evaluated for ink transfer rate and fog density on the plate surface by the same evaluation methods as described above. The results are shown in Table D3.

Meanwhile, BG represents ethylene glycol monobutyl ether (b.p. 171° C.; SP value: 9.8) available from Wako Pure Chemical Industries, Ltd.

TABLE E1

| Ink | E1 | E2 | E3 | E4 | E5 |
|---|---|---|---|---|---|
| Pigment water dispersion | 54.5 | 54.5 | 54.5 | 54.5 | 54.5 |
| Dispersion liquid of polymer particles | 19.5 | 19.5 | 19.5 | 19.5 | 19.5 |
| iBDG (SP value: 8.7) | 7.0 | | | 0.5 | 10.0 |
| MFG (SP value: 10.4) | | 7.0 | | | |
| BG (SP value: 9.8) | | | 7.0 | | |
| Silicone-based surfactant | 1.0 | 1.0 | 1.0 | 2.0 | 1.0 |
| Acetylene glycol-based surfactant | 1.0 | 1.0 | 1.0 | 3.0 | 1.0 |
| Thickening agent | 0.8 | 0.8 | 0.8 | 0.8 | 0.8 |
| 5N NaOH | 0.77 | 0.77 | 0.77 | 0.77 | 0.77 |
| Ion-exchanged water | 15.4 | 15.4 | 15.4 | 18.9 | 12.4 |
| Total | 100 | 100 | 100 | 100 | 100 |

Examples E1 to E14

The same procedure as in Example A1 was repeated except that the conditions used in Example A1 were changed to those shown in Table E2.

The details of the film substrates shown in Table E2 are as follows.

TABLE D3

| | Examples | | | | | | | | | | | |
|---|---|---|---|---|---|---|---|---|---|---|---|---|
| | D1 | D2 | D3 | D4 | D5 | D6 | D7 | D8 | D9 | D10 | D11 | D12 |
| Ink No. | D1 | D1 | D1 | D1 | D1 | D1 | D1 | D1 | D1 | D1 | D2 | D3 |
| Conditions of Blowing of hot air | | | | | | | | | | | | |
| Air quantity (L/min) | 1.83 | 0.080 | 9.50 | 1.83 | 1.83 | 1.83 | 1.83 | 1.83 | 1.83 | 1.83 | 1.83 | 1.83 |
| Air velocity (m/s) | 0.8 | 0.2 | 2.0 | 0.8 | 0.8 | 0.8 | 0.8 | 0.8 | 0.8 | 0.8 | 0.8 | 0.8 |
| Temperature (° C.) | 25 | 25 | 25 | 15 | 40 | 25 | 25 | 25 | 25 | 25 | 25 | 25 |
| Relative humidity (%) | 20 | 20 | 20 | 20 | 20 | 1 | 40 | 20 | 20 | 20 | 20 | 20 |
| Pore diameter of nozzle (mm) | 7 | 3 | 10 | 7 | 7 | 7 | 7 | 7 | 7 | 7 | 7 | 7 |
| Interval between nozzles (mm) | 100 | 100 | 100 | 100 | 100 | 100 | 100 | 50 | 200 | 100 | 100 | 100 |
| Air suction | None | None | None | None | None | None | None | None | None | Used | None | None |
| Transfer rate of ink | ⊚ | ⊚ | ○ | ○ | ○ | ○ | ○ | Δ | ○ | ⊚ | ○ | ○ |
| | 63 | 69 | 60 | 58 | 56 | 57 | 60 | 54 | 59 | 63 | 57 | 60 |
| Fog density on plate surface | ○ | ○ | ⊚ | ○ | ○ | ○ | ○ | ○ | Δ | ⊚ | ○ | ○ |
| | 0.38 | 0.40 | 0.32 | 0.39 | 0.36 | 0.36 | 0.39 | 0.38 | 0.44 | 0.32 | 0.36 | 0.40 |

From Table D3, it was confirmed that in the printing method used in Examples D1 to D12 (fourth embodiment), even when the printing was conducted at a printing speed of 100 m/s, the transfer rate of the ink was high so as to allow stable continuous printing, and at the same time, fogging on the plate surface was suppressed to provide a high-quality printed material.

Preparation Examples E1 to E5 (Preparation of Inks E1 to E5)

Fifth Embodiment

The same procedure as in Preparation Example A1 was repeated except that the formulation of the ink prepared in Preparation Example A1 was changed to those shown in Table E1, thereby obtaining inks E1 to E5.

The meanings of the symbols for the solvents shown in Table E1 are the same as those shown in the aforementioned Table A1.

OPP: OPP film; "FOR-AQ #20"; laminate grade; corona-treated; thickness: 20 μm; available from Futamura Chemical Co, Ltd.

PET: PET film; "FE2001 #12"; corona-treated; thickness: 12 μm; available from Futamura Chemical Co, Ltd.

CPP: CPP film; "FHK2 #20"; laminate grade; corona-treated; thickness: 20 μm; available from Futamura Chemical Co, Ltd.

NY: Nylon film; "HARDEN FILM, N1100 #25"; general type; corona-treated; thickness: 25 μm; available from TOYOBO Co, Ltd.

PS: OPS film; "GM #14"; general type; thickness: 14 μm; available from Asahi Kasei Chemicals Corporation.

PE: LLDPE film; "LL-UL #40"; corona-treated; thickness: 40 μm; available from Futamura Chemical Co, Ltd.

<Evaluation of Inks>

The resulting inks were evaluated for ink transfer rate and fog density on the plate surface by the same evaluation methods as described above. The results are shown in Table E2.

TABLE E2

|  | Examples | | | | | | | | | | | | | |
| --- | --- | --- | --- | --- | --- | --- | --- | --- | --- | --- | --- | --- | --- | --- |
|  | E1 | E2 | E3 | E4 | E5 | E6 | E7 | E8 | E9 | E10 | E11 | E12 | E13 | E14 |
| Ink No. | E1 | E1 | E1 | E1 | E1 | E2 | E3 | E4 | E5 | E1 | E1 | E1 | E1 | E1 |
| Conditions of nip roll | | | | | | | | | | | | | | |
| Material of rubber roll | NBR | EPDM | Butyl rubber | NBR | NBR | NBR | NBR | NBR | NBR | NBR | NBR | NBR | NBR | NBR |
| Rubber hardness (°) | 70 | 80 | 65 | 70 | 70 | 70 | 70 | 70 | 70 | 70 | 70 | 70 | 70 | 70 |
| Nip pressure (MPa)* | 0.15 | 0.15 | 0.15 | 0.05 | 0.3 | 0.15 | 0.15 | 0.15 | 0.15 | 0.15 | 0.15 | 0.15 | 0.15 | 0.15 |
| Film substrate | OPP | OPP | OPP | OPP | OPP | OPP | OPP | OPP | OPP | CPP | PET | NY | PS | PE |
| Transfer rate of ink | ○ 67 | ○ 56 | ○ 60 | ○ 56 | ◎ 63 | △ 52 | ○ 57 | ○ 59 | ○ 56 | ○ 56 | ○ 60 | ○ 56 | ○ 57 | ○ 59 |
| Fog density on plate surface | ◎ 0.33 | ○ 0.37 | ○ 0.40 | ◎ 0.31 | ○ 0.40 | ○ 0.37 | △ 0.43 | ○ 0.40 | ○ 0.36 | ○ 0.36 | ○ 0.40 | ○ 0.37 | ○ 0.38 | ○ 0.39 |

Note:
*Contact pressure of a nip roll against a film substrate.

From Table E2, it was confirmed that in the printing method used in Examples E1 to E14 (fifth embodiment), the transfer rate of the ink was high so as to allow stable continuous printing, and at the same time, fogging on the plate surface was suppressed to provide a high-quality printed material.

REFERENCE SIGNS LIST

1: Gravure printing press
10: Ink pan
11: Furnisher roll
12: Gravure roll
13: Doctor blade
13a: Base portion
13b: Blade edge portion
14: Nip roll
15: Feed roll for feeding a printing substrate
16: Take-up roll for taking up a printing substrate
20: Printing substrate
30: Air nozzles
31: Suction nozzles

The invention claimed is:

1. A gravure printing method of conducting printing on a printing substrate with an aqueous ink reserved in an ink pan using a furnisher roll, a gravure roll, a doctor blade and a nip roll, in which:
   the aqueous ink comprises a pigment, a polymer, an organic solvent, a surfactant and water;
   a content of organic solvent components of the organic solvent which have a boiling point of not lower than 100° C. and not higher than 260° C. in the aqueous ink is not less than 1% by mass and not more than 9% by mass;
   an average particle size of particles of the pigment is not less than 190 nm and not more than 250 nm;
   in a particle size distribution of particles in the aqueous ink, a frequency of the particles having a particle size of not more than 130 nm is not more than 40% by volume;
   in a particle size distribution of the particles in the aqueous ink, a polydispersity index of the particles in the aqueous ink is not less than 0.18 and not more than 0.3; and
   an arithmetic mean roughness (Ra) of a plate surface of the gravure roll is not less than 20 nm and not more than 130 nm.

2. The gravure printing method according to claim 1, wherein a maximum height (Rz) of the plate surface of the gravure roll is not less than 100 nm and not more than 250 nm.

3. The gravure printing method according to claim 1, wherein a content of the surfactant in the aqueous ink is not less than 0.1% by mass and not more than 10% by mass.

4. The gravure printing method according to claim 1, wherein a content of the organic solvent components having a boiling point of lower than 100° C. in the aqueous ink is not more than 5% by mass.

5. The gravure printing method according to claim 1, wherein an SP value of the organic solvent is not less than 8 and not more than 11.

6. The gravure printing method according to claim 1, wherein the printing substrate is a resin film.

7. The gravure printing method according to claim 6, wherein a thickness of the resin film is not less than 10 μm and not more than 100 μm.

8. The gravure printing method according to claim 1, wherein:
   a content of the organic solvent components having a boiling point of lower than 100° C. in the aqueous ink is not more than 5% by mass;
   a static surface tension of the aqueous ink as measured at 20° C. is not less than 23 mN/m and not more than 30 mN/m;
   a rubber hardness of the furnisher roll is not less than 70° and not more than 80°;
   a contact pressure under which the furnisher roll is contacted with the gravure roll is not less than 0.2 MPa and not more than 0.25 MPa; and
   a rotating speed of the furnisher roll is not less than 10% and not more than 20% on the basis of 100% of a rotating speed of the gravure roll,
   wherein the rubber hardness is measured using a rubber hardness tester according to the methods prescribed in JIS K 6301-1975 and JIS K 7215-1986.

9. The gravure printing method according to claim 1, wherein the furnisher roll is formed of at least one material selected from the group consisting of an acrylonitrile-butadiene rubber, an ethylene-propylene rubber and a butyl rubber.

10. The gravure printing method according to claim 1, wherein a surface of the doctor blade has a Vickers hardness of not less than 800 Hv and not more than 950 Hv, and a thickness of an edge portion of the doctor blade is not less than 70 μm and not more than 90 μm; and
  a contact pressure between the doctor blade and the gravure roll is not less than 0.1 MPa and not more than 0.28 MPa.

11. The gravure printing method according to claim 1, wherein a plated layer formed on the doctor blade is a nickel plated layer, a nickel/ceramic composite plated layer, a ceramic plated layer, or a ceramic/fluororesin composite plated layer.

12. The gravure printing method according to claim 1, wherein:
  a dispersing medium comprising the organic solvent and water has an average boiling point of not lower than 100° C. and not higher than 122° C.; and
  after scraping off the aqueous ink on the plate surface of the gravure roll by the doctor blade, a hot air having a temperature of not lower than 15° C. and not higher than 45° C. and a relative humidity of not less than 0% and not more than 50% is blown against the plate surface of the gravure roll from air nozzles disposed at the intervals of not less than 30 mm and not more than 250 mm at an air quantity of not less than 0.05 L/min and not more than 15 L/min.

13. The gravure printing method according to claim 12, wherein a velocity of the hot air blown is not less than 0.2 m/s and not more than 2.0 m/s.

14. The gravure printing method according to claim 12, wherein a pore diameter of the respective air nozzles is not less than 2 mm and not more than 12 mm.

15. The gravure printing method according to claim 12, wherein the plate surface of the gravure roll is subjected to air suction after blowing the hot air thereagainst.

16. The gravure printing method according to claim 1, wherein a rubber hardness of the nip roll is not less than 55° and not more than 85°, and a contact pressure under which the nip roll is contacted with the printing substrate is not less than 0.04 MPa and not more than 0.35 MPa,
  wherein the rubber hardness is measured using a rubber hardness tester according to the methods prescribed in JIS K 6301-1975 and JIS K 7215-1986.

17. The gravure printing method according to claim 1, wherein the nip roll is formed of at least one material selected from the group consisting of an acrylonitrile-butadiene rubber, an ethylene-propylene rubber and a butyl rubber.

* * * * *